(12) United States Patent
Ushiyama

(10) Patent No.: US 8,676,855 B2
(45) Date of Patent: Mar. 18, 2014

(54) DISTRIBUTED STORAGE SYSTEM, MANAGEMENT APPARATUS, NODE APPARATUS, RECORDING MEDIUM ON WHICH NODE PROGRAM IS RECORDED, PAGE INFORMATION ACQUISITION METHOD, RECORDING MEDIUM ON WHICH PAGE INFORMATION SENDING PROGRAM IS RECORDED, AND PAGE INFORMATION SENDING METHOD

(75) Inventor: Kentaro Ushiyama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 535 days.

(21) Appl. No.: 12/659,804

(22) Filed: Mar. 22, 2010

(65) Prior Publication Data

US 2010/0281063 A1    Nov. 4, 2010

(30) Foreign Application Priority Data

May 1, 2009  (JP) ................................. 2009-112335
May 1, 2009  (JP) ................................. 2009-112336

(51) Int. Cl.
 *G06F 17/30*   (2006.01)

(52) U.S. Cl.
 USPC ......................................................... 707/797

(58) Field of Classification Search
 USPC ......................................................... 707/797
 See application file for complete search history.

(56) References Cited

U.S. PATENT DOCUMENTS

| | | | |
|---|---|---|---|
| 6,226,743 B1 * | 5/2001 | Naor et al. ..................... | 713/177 |
| 2002/0114341 A1 * | 8/2002 | Sutherland et al. ........... | 370/428 |
| 2002/0138744 A1 * | 9/2002 | Schleicher et al. ........... | 713/187 |
| 2002/0147810 A1 * | 10/2002 | Traversat et al. ............. | 709/224 |
| 2002/0184357 A1 * | 12/2002 | Traversat et al. ............. | 709/223 |
| 2003/0028585 A1 * | 2/2003 | Yeager et al. .................. | 709/201 |
| 2003/0070070 A1 * | 4/2003 | Yeager et al. .................. | 713/157 |
| 2005/0273686 A1 * | 12/2005 | Turner et al. ................... | 714/752 |
| 2007/0283043 A1 | 12/2007 | Kiyohara et al. | |
| 2008/0147821 A1 * | 6/2008 | Dietrich et al. ............... | 709/216 |
| 2009/0037445 A1 | 2/2009 | Ushiyama | |

FOREIGN PATENT DOCUMENTS

| | | |
|---|---|---|
| JP | A-2006-197400 | 7/2006 |
| JP | A-2007-053662 | 3/2007 |
| JP | A-2007-280303 | 10/2007 |

* cited by examiner

*Primary Examiner* — Rehana Perveen
*Assistant Examiner* — Hung Havan
(74) *Attorney, Agent, or Firm* — Oliff PLC

(57) ABSTRACT

A node apparatus acquires root link information including a serial number of root page information, information for checking the root page information for tampering, and a digital signature for checking the root link information for tampering from a management apparatus or another node apparatus that stores the root link information through a network and determines a range of page information assigned to each node apparatus according to predetermined rules. The node apparatus determines whether page information that is a child of the root page information indicated by the acquired root link information is within the assigned range. If so, the node apparatus acquires the child page information and pieces of page information linked together from the child to leaf page information from the management apparatus or another node apparatus as page information assigned to the node apparatus and stores the acquired page information in a storage area.

17 Claims, 18 Drawing Sheets

DISTRIBUTED STORAGE SYSTEM, MANAGEMENT APPARATUS, NODE APPARATUS, RECORDING MEDIUM ON WHICH NODE PROGRAM IS RECORDED, PAGE INFORMATION ACQUISITION METHOD, RECORDING MEDIUM ON WHICH PAGE INFORMATION SENDING PROGRAM IS RECORDED, AND PAGE INFORMATION SENDING METHOD

CROSS REFERENCE TO RELATED APPLICATION

The present application claims priority from Japanese Patent Applications No. 2009-112335 and No 2009-112336, both which were filed on May 1, 2009, the disclosure of which were incorporated herein by reference in its entirety.

BACKGROUND OF THE INVENTION

1. Field of the Invention

The present invention relates to a data structure for searching for or managing desired content data. In particular, the present invention relates to a data structure and a data search technique capable of reliably preventing tampering of records of information such as attribute information of content data.

2. Related Art

In a distributed content storage system of this kind, each node apparatus can acquire desired content data from another node apparatus or a content management server by using content catalog information containing attribute information of content data. The attribute information includes information such as content names, publish dates, expiration dates, and keywords for searching content data. The content catalog information is generated by a content management server, for example, and distributed by the content management server to node apparatuses. When new content data is added to the distributed content storage system or content data has expired, the content management server updates the content catalog information and distributes the updated catalog information to the node apparatuses.

The data amount of content catalog information increases as the number of items of content data available in the distributed content storages system increases. This has posed a problem that content catalog information overflows a single node apparatus. To solve the problem, a configuration has been proposed in which content catalog information is split into multiple pieces and the pieces of content catalog information are distributed over and stored in multiple node apparatuses.

When each node apparatus stores the split content catalog information, a digital signature needs to be added to the attribute information of each item of content data in order to prevent tampering of the content catalog information.

Adding, updating, or deleting attribute information of content data in content catalog information involves searching for the content catalog information. Specifically, the location where the content catalog information is to be inserted, updated or deleted needs to be searched for. Conventional systems are inefficient because an entire list of items of content catalog information to which digital signatures have been applied needs to be searched through for desired content data.

SUMMARY OF THE INVENTION

The present invention has been made in light of these circumstances. An object of the present invention is to provide a distributed storage system which sends management information such as content catalog information to node apparatuses, is capable of reliably preventing tampering of records of information such as attribute information of content data and also capable of improving the efficiency of data search, and to provide a management apparatus, a node apparatus, a recording medium on which a node program is recorded, a recording medium on which page information sending program is recorded, a page information acquisition method, and a page information sending method used with the distributed storage system.

In order to solve the problems, according to claim 1, one aspect of the present invention includes: a management apparatus and a plurality of node apparatuses, wherein, the management apparatus includes: a first storage device configured to store a plurality of pieces of page information in association with one another as a tree structure descending from root page information to leaf page information, the plurality of pieces of page information including: the leaf page information including one or a plurality of records and being located at a leaf of the tree structure; the root page information including tampering check information used for checking child page information at a position of a child of root page information at a root of the tree structure or the record at a position of a child of the root page information to determine whether or not the child page information or the record has been tampered, and a serial number of child page information at a position of a child of the root page information; and node page information including tampering check information used for checking child page information at a position of a child of node page information located between the root page information and the leaf page information or the record at a position of a child of the node page information to determine whether or not the child page information or the record has been tampered, and a serial number of child page information at a position of a child of the node information; the first storage device configured to store root link information including a serial number of the root page information and tampering check information used for checking the root page information to determine whether or not the root page information has been tampered, the root link information including a digital signature for checking the root link information to determine whether or not the root link information has been tampered; and each of the plurality of node apparatuses includes: a first acquiring device configured to acquire through a network the root link information from the management apparatus or another node apparatus that has acquired the root link information; a first deciding device configured to decide on a range of a plurality of pieces of page information to be assigned to each node apparatus according to a predetermined rule; a first determining device configured to determine whether or not child page information at a position of a child of root page information pointed to by the root link information acquired by the first acquiring device is page information within a range decided on by the first deciding device; a second acquiring device configured to acquire the child page information and pieces of page information associated with one another descending from the child page information to leaf page information from the management apparatus or the another node apparatus as page information within the assigned range if the first determining device determines that the child page information is page information within the assigned range; and a second storage device configured to store the information within the assigned range acquired by the second acquiring device in a predetermined storage area.

According to claim 9, another aspect of the present invention includes: a first storage device configured to store a plurality of pieces of page information in association with one another as a tree structure descending from root page information to leaf page information, the plurality of pieces of page information including: the leaf page information including one or a plurality of records and being located at a leaf of the tree structure; the root page information including tampering check information used for checking child page information at a position of a child of root page information at a root of the tree structure or the record at a position of a child of the root page information to determine whether or not the child page information or the record has been tampered, and a serial number of child page information at a position of a child of the root page information; and node page information including tampering check information used for checking child page information at a position of a child of node page information located between the root page information and the leaf page information or the record at a position of a child of the node page information to determine whether or not the child information or the record has been tampered, and a serial number of child page information at a position of a child of the node page information; the first storage device storing root link information including a serial number of the root page information and tampering check information used for checking the root page information to determine whether or not the root page information has been tampered, the root link information including a digital signature for checking the root link information to determine whether or not the root link information has been tampered; and a sending device configured to send page information stored in the storage device to a node apparatus through a network.

DETAILED DESCRIPTION OF THE PREFERRED EMBODIMENTS

Figure 1:
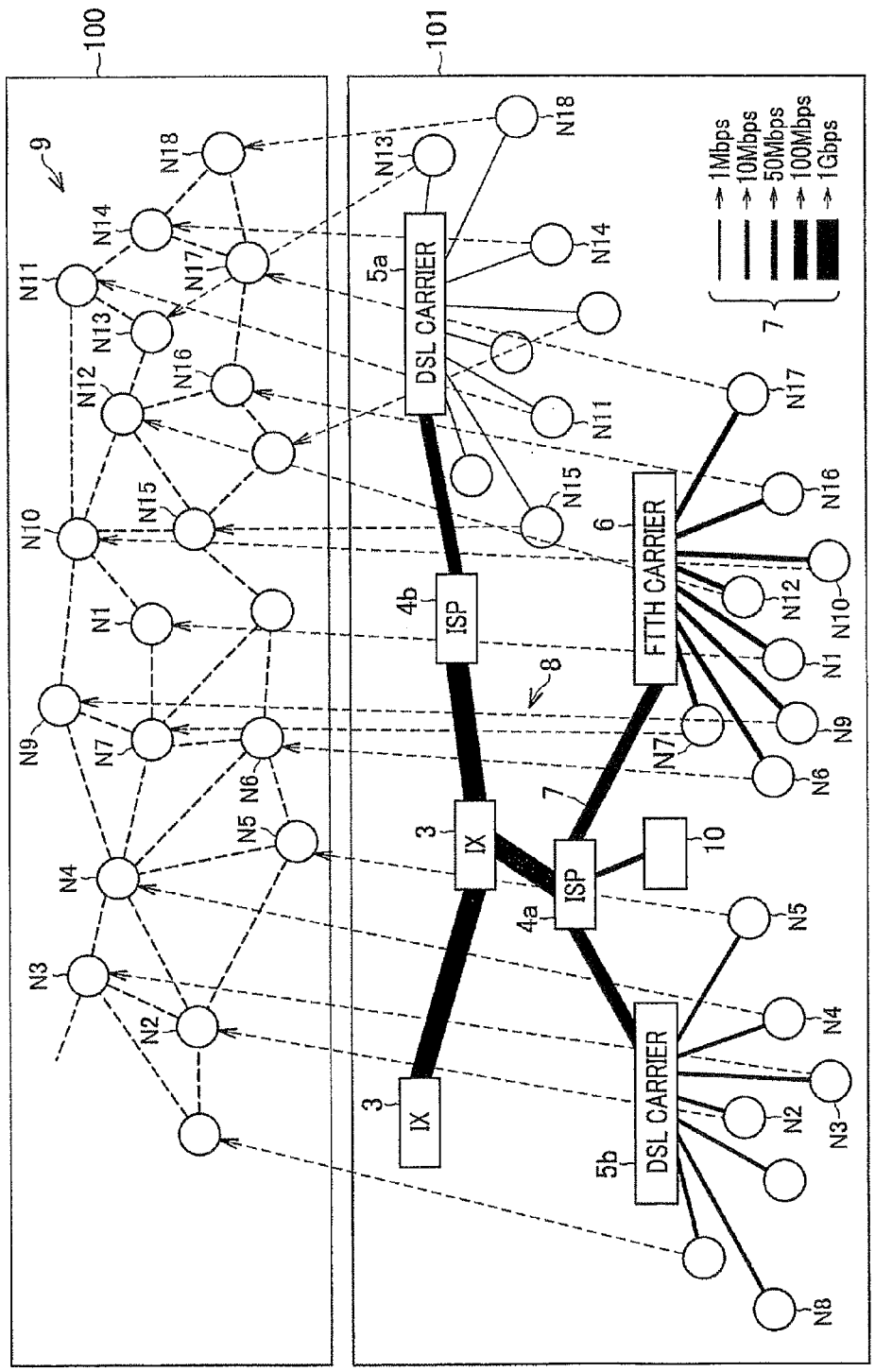
FIG. 1 is a diagram illustrating an exemplary implementation of connection of node apparatuses in a distributed content storage system according to one embodiment.

Embodiments of the present invention will be described with reference to the accompanying drawings. In the embodiments described below, the present invention is applied to a distributed content storage system.

First Embodiment

1. Overview of Configuration and Operations of Distributed Content Storage System An overview of a configuration and operations of a distributed content storage system according to an embodiment will be provided first with reference to the drawings, in particular FIG. 1. As illustrated in the lower box 101 of FIG. 1, the distributed content storage system S includes multiple node apparatuses Nn interconnected through the Internet. Also as illustrated in the lower box 101 of FIG. 1, the network 8, which may be the Internet, includes IXs (Internet eXchanges) 3, ISPs (Internet Service Providers) 4a, 4b, apparatuses 5a, 5b of a DSL (Digital Subscriber Line) carrier, apparatuses 6 of an FTTH (Fiber To The Home) carrier, and communication lines 7. The network 8 is a real-world communication network. Routers for transferring data packets are provided on the network 8 appropriately, which are omitted from FIG. 1. The communication lines 7 may be telephone lines, optical fiber cables, or the like.

Multiple node apparatuses Nn (where n is any of 1, 2, and 3, . . . , n) are connected onto the network 8. Hereinafter, a node apparatus is simply referred to as a "node". A unique serial number and a unique IP (Internet Protocol) address are assigned to each node Nn. The distributed content storage system S according to the present embodiment is a peer-to-peer network system which is formed by connecting any number of nodes Nn as illustrated in the upper box 100 of FIG. 1.

The network 9 illustrated in the upper box 100 of FIG. 1 is an overlay network 9 in which virtual links are formed on the existing network 8. The overlay network 9, which is a logical network, is implemented by using a certain algorithm, for example an algorithm using a DHT (Distributed Hash Table). A node ID, which is unique identification information consisting of a predetermined number of digits, is assigned to each node Nn connected onto the distributed content storage system S.

The node ID may be a value generated by hashing the IP address or serial number assigned to each individual node Nn by using a common hash function. The node IDs will be uniformly dispersed in an ID space. The hash function may be SHA-1, for example. The hashed value has a bit length of 160 bits, for example.

An unconnected node Nn, for example node N8, can be connected onto the distributed content storage system S by sending an participation message indicating a request for participating in the distributed content storage system S to any of the nodes Nn connected onto the distributed content storage system S. Participation in the distributed content storage system S means that the node apparatus Nn is connected onto the distributed content storage system S and becomes able to acquire data from the distributed content storage system S. Any node Nn may be a contact node, for example, that is always connected to the distributed content storage system S.

Each node Nn holds a routing table using a DHT. The routing table defines transfer destinations of various messages on the distributed content storage system S. Specifically, multiple items of node information, including node IDs of nodes Nn moderately dispersed in the ID space, IP addresses, and port numbers, are registered in the routing table.

One node connected to the distributed content storage system S stores node information concerning a minimum number of nodes Nn as the routing table. Node information concerning nodes Nn for which node information is not stored is acquired by transferring various messages between nodes Nn. Since such a routing table using DHT is disclosed in documents such as Japanese Patent Laid-Open No. 2006-197400 and is well known, detailed description of which will be omitted.

The distributed content storage system S stores replicas of various types of different content data in a predetermined file format among multiple nodes Nn in a distributed manner. Hereinafter, content data is referred to as "content(s)". The replicas can be used among the nodes Nn. Original contents are stored in a center server SA. For example, a replica of a movie content having title XXX is stored on node N5; a replica of a movie content having title YYY is stored on node N3. In this way, contents are distributed and stored among multiple nodes Nn. Hereinafter, a node N on which a replica of a content is stored is referred to as a "content holding node".

Unique identification information such as a content name and a content ID is assigned to each of replicas of contents. The content ID may be generated by, for example, hashing the content name plus an arbitrary value by using the common hash function used for generating the node ID. Alternatively, a system administrator may assign a unique ID value to each content.

The locations of replicas of contents that are stored in a distributed manner are stored on a node Nn that manages (stores) the locations of replicas of contents as index information. Hereinafter, a node Nn that manages (stores) the locations of replicas will be referred to as a "root node". The index information includes sets of node information concerning the nodes Nn that store replicas and the content ID of the content. For example, the node Nn that has the node ID closest to the content ID is specified as the root node. The node ID closest to a content ID is a node ID that includes the largest number of leftmost digits that are identical to the corresponding digits of the content ID.

For example, index information for a replica of a movie content having title XXX is managed by node N4 that is the root node for the content; index information for a replica of a movie content having title YYY is managed by node N7 that is the root node of the content. A node Nn having the node ID that is closest to the content ID is specified as the root node. The node ID closest to a content ID is a node ID that includes the largest number of leftmost digits that are identical to the corresponding digits of the content ID.

When a user of a node Nn wants to acquire a replica of a desired content, the node Nn that wants to the replica (hereinafter referred to as a "user node") generates a message. The message is a content location query message containing information such as the content ID of the desired content and the IP address of the user node. The content location query message also acts as a message for searching for a content holding node. The content location query message is sent to another node Nn according to a DHT routing table acquired by the user node. That is, the user node directs the content location query message to the root node. Accordingly, the content location query message eventually arrives at the root node through DHT routing by using the content ID as a key.

On each node Nn, attribute information such as content names and content IDs of contents is contained in content catalog information. The content catalog information is generated by the center server SA for each piece of page information, which will be described later. A structure and items of the content catalog information and a method for generating the content catalog information will be described later in detail. Each node Nn has its own range of page information assigned to the node Nn. Each node Nn acquires page information in the range to be assigned to the node Nn from the center server SA or another node Nn in advance. If a node Nn does not have page information required for searching for the attribute information of a content, the node Nn acquires the required page information from the center server SA or another node Nn. Details of the range of page information that is assigned to a node Nn and the search will be described later. The content ID contained in the content location query message may be generated by hashing the content name of the content by using the common hash function on the user node. Further description of the DHT routing will omitted since the DHT routing is disclosed in documents such as Japanese Patent Laid-Open No. 2006-197400 and is well known.

When the root node receives the content location query message, the root node retrieves index information corresponding to the content ID contained in the content location query message from an index information cache. The retrieved index information is sent to the user node that is the sender of the content location query message in return. The user node, which has thus acquired the index information, can acquire (download) a replica of the content on the basis of the index information. Based on information such as the IP address of a content holding node contained in the index information, the user node accesses the content holding node. The user node can download a replica of the content from the content holding node it accessed. Here, the user node selects one of multiple content holding nodes. The user node can then connect to the content holding node it selected to download a replica of the content.

The root node can send a content sending request message to the content holding node indicated by the IP address contained in the index information, so that the user node can download the replica from the content holding node. The user node also can acquire the index information from a cache node that is caching the same index information as the index information in the root node before the content location query message arrives at the root node.

When the user node acquires and stores a replica of a content from a content holding node, the user node which stored the replica generates a publish message. The publish message notifies to the root node that the replica has been stored. The publish message contains the content ID of the replica and node information about the node apparatus that has stored the replica. The publish message is directed to the root node. The publish message arrives at the root node through DHT routing using the content ID as a key, like the content location query message. The root node receives the published message. The root node stores index information including the set of the node information and the content ID contained in the publish message in an index information cache area. As a result, the user node becomes the content holding node that newly holds the replica of the content.

2. Structure and Items of Content Catalog Information

A structure and items of content catalog information will be described with reference to FIG. 2. Hereinafter, content catalog information is also simply referred to as catalog information.

Catalog information is information used for managing attribute information of contents as a list. The attribute information is stored in a record. The catalog information enables a content to be uniquely identified by a search key. Enabling a content to be identified means that the record of the content is enabled to be located. The search key is a value generated by hashing the record corresponding to the content or the content name, for example, by using a hash function. Alternatively, the search key may be the content ID or the content name. The search key is an example of index information. Catalog information used in the present embodiment has a search tree structure illustrated in FIG. 2 in order to prevent tampering of attribute information of contents and to enable content search to be efficiently performed.

Figure 2:
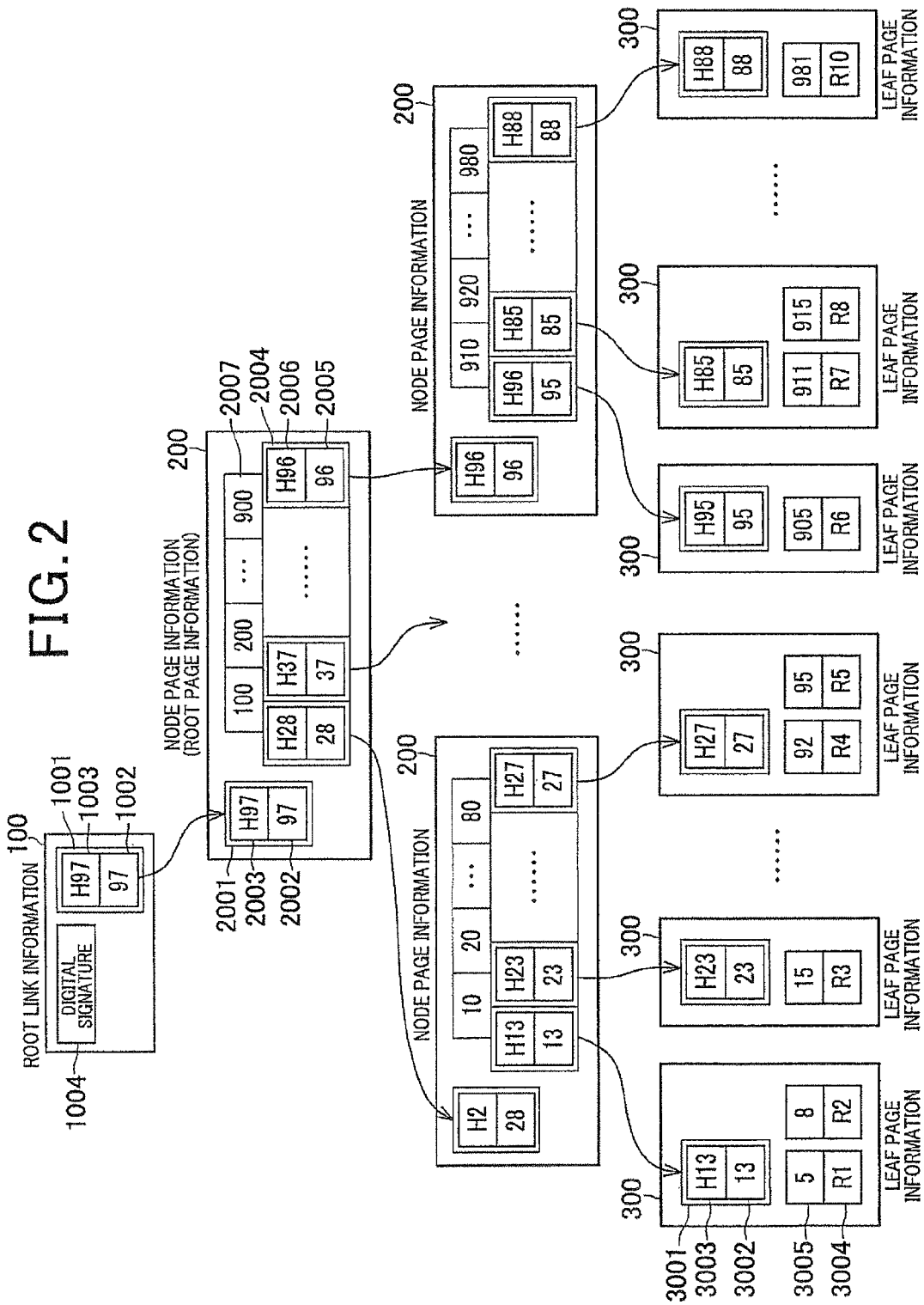
FIG. 2 is a diagram illustrating an exemplary structure of content catalog information according to one embodiment.

As illustrated in FIG. 2, catalog information includes pieces of page information associated with one another, from root page information at the root of the tree structure to leaf page information at leaves of the tree structure. Pieces of page information directly associated with each other form a parent-child relationship. If page information X is associated with page information Y, then page information X and page information Y form a parent-child relationship. If page information X is at a shorter distance from the root page information than page information Y, page information X is the page information at the parent node point viewed from page information Y. Here, the distance from the root page information to a node point of interest is equivalent to the number of links along the path from the root to the node point of interest in the tree structure. In other words, the distance from the root page information to page information of interest is equivalent to the number of pieces of page information, including the page information of interest, along links to be followed from the root page information to the page information of interest. In the following description, page information at the parent node is called parent page information and page information at the child node is called child page information.

Association between the parent page information and child page information is indicated by link information. The link information is contained in the parent page information and points to child page information. The link information includes the page number of child page information and a message digest used for checking the child page information for tampering.

The page number is a serial number uniquely assigned to each piece of page information. The term "page information pointed to by link information" means the page information to which the page number contained in the link information is assigned. When certain page information is updated, a new page number is assigned to the page information, which will be described later in further detail. The term "updating" page information as used herein means generating an updated version of original page information as separate page information from the original page information. In practice, a page number corresponds to a storage address of a location in a RAM, for example, where page information is stored. A page number may be a storage address of a pointer to a storage location of page information. A page number may correspond to a file name if the page information is stored as a file.

The message digest is information used to check child page information pointed to by link information or a record contained in child page information pointed to by link information for tampering. The message digest is a value generated by using a common hash function to hash information to be checked for tampering. The message digest is an example of tampering check information.

The catalog information further includes root link information (100 in FIG. 2). Link information pointing to loot page information is contained in the root link information (1001 in FIG. 2). The link information includes the page number (1002 in FIG. 2) and message digest (1003 in FIG. 2) of root page information. The root link information further includes a digital signature (1004 in FIG. 2). The digital signature is information used for checking root link information for tampering. The digital signature includes information such as a signature value and certification information.

The page information falls into two broad categories: node page information (200) and leaf page information (300). The node information has one or more pieces of child page information. The node page information contains self-link information (2001), link information pointing to child page information (2004), and an index (2007). The self-link information is link information pointing to the node page information itself that contains the self-link information. That is, the self-link information includes the page number (2002) and message digest (2003) of the node page information. Accordingly, the self-link information is the same as the link information pointing to the node page information that is contained in the parent page information of the node page information.

Link information pointing to child page information includes the page number (2005) and message digest (2006) of the child page information. The term "link information" in node page information as used herein refers to link information pointing to child page information, rather than self-link information. Node page information can contain multiple pieces of link information. The maximum number of pieces of link information that can be contained in each piece of node page information is equal to the order of the tree structure of the catalog information. The order is the maximum number of children that a parent can have. That is, the order is equal to value n of an n-ary search tree.

An index acts as what is called a key, a value that a node point of the search tree has. The index is information used for searching for page information containing a record of a content by using a search key. The indexes depicted in FIG. 2 are represented in decimal notation for convenience. The index is an example of index information and assigned range information.

The tree structure of the catalog information is orderly. Accordingly, indexes contained in node page information are arranged in ascending order of value. Pieces of link information are arranged according to the order of the indexes. For example, the first link information indicates association with child page information that contains indexes in a range of values smaller than or equal to the value of the first index; the second link information indicates association with child page information that contains indexes in a range of values greater than the first index value and smaller than or equal to the value of the second index. If node page information currently contains k pieces of link information, the node page information contains k−1 indexes.

Leaf page information is page information at a leaf node point in the search tree as described above. That is, the leaf page information does not have child page information. Leaf page information contains self-link information (3001), records (3004), and indexes (3005). The self-link information is link information pointing to the leaf page information itself that contains the self-link information. That is, the self-link information includes the page number (3002) and message digest (3003) of the leaf page information. Accordingly, the self-link information is the same as the link information pointing to the leaf page information that is contained in the parent page information of the leaf page information.

Records and indexes are associated with each other in one-to-one correspondence. One or more sets of record and index associated with each other are contained in each piece of leaf page information. Attribute information of one or more contents are set in each record. For example, information such as a content ID, content publish time and date, expiration time and date, content name, keyword are set in a record. The index is information for uniquely identifying its corresponding record. The type of information used as an index of the leaf page information is the same as that of the information used as an index of the node page information. If a content ID or content name is used as an index, the information does not need to be included in information set in the record. The index is an example of index information.

While a digital signature is generated only for root link information in the present embodiment as stated above, digital signatures may be generated for all pieces of page information. Since the digital signature is generated by setting information such as certificate information, the digital signature typically has a higher level of security than a message digest. A large amount of computation is required for processing of a digital signature such as encryption of the digital signature for improving its security level and decryption in checking for tampering and a large amount of data such as digital certificate information is required for the digital signature. Accordingly, the message digest can save both of the amount of computation and the amount of data of page information compared with the digital signature. If digital signatures are generated for all pieces of page information, root link information is not an absolute necessity. In that case, only a digital signature for root page information need be stored. While new page information is generated when page information is updated in the present embodiment as described above, the page information itself may be modified.

The structure of the catalog information described above with reference to FIG. 2 is illustrative only. The catalog information may have any tree structure in which the record of a content can be searched for. For example, records may be contained not only in leaf page information but in node page information. The order of the tree structure, that is, the maximum number of pieces of link information that can be contained in each piece of node page information is not limited.

Any number of records can be stored in each piece of page information. Furthermore, the self-link information may be omitted.

Also, indexes for node page information are not essential. For example, a trie tree does not require indexes for node page information. In a trie tree structure, the positions of pieces of page information correspond to indexes and the tree is traversed from the root page information to leaf page information according to values of bits or characters of a search key. For example, suppose that the four highest-order bits of a search key are assigned to each of pieces of node page information, from the root page information toward leaf page information. In this case, one piece of node page information has an array that store 16 pieces of link information as elements. For example, if a search key is F3405B9C in hexadecimal notation, the leftmost digit, F, is the index of the array of root page information. That is, link information in the 16th entry of the array in the root page information is link information pointing to child page information to be referred to next. The second leftmost digit, 3, is the index of the array of page information that is a child of the root page information. That is, link information in the 4th entry of the array in the child page information is the link information pointing to the child page information to be visited next. When leaf page information is reached finally, the entire search key is compared with the indexes of records. Search is performed in this way.

Also, indexes for leaf page information are not essential. In a trie tree, for example, records with index values with a relatively large difference between them can be put together. For example, suppose that there are records with indexes F3405B9C and F34013A2 in hexadecimal notation. The values of the three leftmost digits of the two indexes are the same. If there are no other records with the tree leftmost digits, F34, and each piece of leaf page information can contain two or more records, two records can be contained in the same leaf page information. That is, two records can be contained in leaf page information that is reached by traversing the trie tree from the root page information to F to 3 to 4. In this case, the leaf page information needs indexes of the records. On the other hand, suppose that pieces of node page information are generated for all of seven leftmost digits of each search key and the value of the last digit of each search key is assigned to leaf page information. In this case, each piece of leaf page information has an array that contains 16 records as elements. A record with an index F3405B9C is contained in the 10th entry of the array in the leaf page information that is reached by following the trie tree from the root page information to F-3-4-0-5-B-9. In this case, the leaf page information does not need indexes for records.

A specific example will be described below. It is assumed here that an index of a content is a 4-digit quaternary number. In this case, each piece of node page can contain four pieces of link information. For example, root page information has an array containing pieces of link information pointing to pieces of page information with indexes having the leftmost digits of 0, 1, 2 and 3, respectively. In this case, link information pointing to the page information with an index having the leftmost digit of 0 is placed in the position corresponding to the leftmost digit of 0. Link information pointing to the page information with an index having the leftmost of 1 is placed in the position corresponding to the leftmost digit of 1. Link information pointing to the page information with an index having the leftmost of 2 is placed in the position corresponding to the leftmost digit of 2. Link information pointing to the page information with an index having the leftmost digit of 3 is placed in the position corresponding to the leftmost digit of 3.

Next, for example suppose that page information with an index having the leftmost digit of 1 has an array containing pieces of link information pointing to pieces of page information with indexes with the two leftmost digits of 10, 11, 12 and 13. In this case, link information pointing to page information with an index having the two leftmost digits of 10 is placed in the position corresponding to the second leftmost value 0. Link information pointing to the page information with an index having the two leftmost digits of 11 is placed in the position corresponding to the second leftmost value 1. Link information pointing to the page information with an index having the two leftmost digits of 12 is stored in the position corresponding to the second leftmost digits of 2. Link information pointing to the page information with an index having the first two digits of 13 is stored in the position corresponding to the second leftmost digit of 3.

Next, for example, suppose page information with an index having the two leftmost digits of 10 has an array containing pieces of link information pointing to pieces of page information with indexes having the leftmost three digits of 100, 101, 102 and 103. In this case, link information pointing to the page information with an index having the leftmost three digits of 100 is stored in the position corresponding to the third leftmost digit of 0.

Next, for example, page information with an index having the first three digits of 102 is leaf page information. The page information with an index having the first three digits of 102 has an array containing four records with index values of 1020, 1021, 1022 and 1023. In this case, the record with the index 1020 is placed in the position corresponding to the rightmost digit of 0.

The tree may be a balanced tree such as a B−tree, a B+tree, or a red-black tree or may be a simple n-ary search tree that is not balanced. When a record is added or deleted, the catalog information needs to be updated, that is, the page information needs to be updated. In the present embodiment, page information is updated under the following three rules.

(1) When page information is updated, an updated version of the original page information is newly generated as in the case of page information being added. For example, when page information is generated and is stored on a RAM, new page information is generated at an address different from the address at which the original page information is stored. When root link information is updated, an updated version of the original root link information is newly generated.

(2) When page information is newly generated, page numbers are assigned in order of generation.

(3) When page information is newly generated, a message digest for the new page information is computed.

(4) When root link information is newly generated, a digital signature is generated for the new root link information.

(5) The page number and message digest of newly generated page information are set in parent page information as new link information pointing to the page information. That is, the parent information also needs to be updated. When root page information is newly generated, the page number and message digest of the root page information are set in the root link information as new link information pointing to that page information. That is, the root link information also needs to be update.

(6) Update of page information is started with page information to which a record is to be added or from which a recode is to be deleted. Pieces of page information along the path from the page information to which the record is added or from which a record is deleted to the root page information are updated in descending order of distance from the root page. That is, supposing that the root page information is at the top and leaf page information is at the bottom, the pieces of page information are updated from bottom to top.

Rules (1) and (2) are intended to prevent old page information from being inserted into the catalog information. Rules (3) to (5) are intended to prevent tampering of the catalog information. Rule (6) is naturally derived from rule (5) in order to prevent tampering of the catalog information. These rules are provided for the purpose of the present embodiment. For example, rule (1) is not essential in the present invention as stated earlier. Page information that has become obsolete because of newly generated page information, that is, page information that is no longer referred to may or may not be deleted at the time the page information has become obsolete. Alternatively, obsolete page information may be deleted periodically.

A total file size is set in each piece of page information in the present embodiment. The total file size is the sum of the file sizes of all pieces of page information included in a sub-tree in which page information in which the total file size is set is at the top. The total file size is calculated when a recode is added or deleted, or page information is generated or deleted. The total file size is set in page information.

The total file size is also calculated when a range to be assigned to page information at each node Nn is determined. The total file size may be calculated at any other appropriate timing. The range assigned to page information will be described below in detail.

3. Assigned Range of Page Information and Record Search

A range of page information assigned to node Nn and record search by a node Nn will be described with reference to FIGS. 3 through 6.

A record is searched for in a record search process performed on the center server SA, which will be described later. When a record is searched for, page information containing the record of interest is searched for in the same way as search in a tree structure. That is, the method of searching for page information depends on a search algorithm for the tree structure of the catalog information. The same method is used when a record is to be added or deleted.

Like the server SA, each node Nn searches catalog information for a record of a content. Accordingly, up-to-date page information is required for the search. If all of up-to-date page information were held at every node Nn, page information could be searched for on each node Nn. However, if a huge number of contents were registered, the amount of catalog information would become huge and so would the amount of page information. Then, one node Nn could not hold all page information.

To prevent this, each node Nn determines a range to be assigned to itself in the present embodiment. An assigned range is a range of page information that is held in each node Nn in advance. The assigned range is determined on the basis of the node ID of each node Nn. The assigned range is determined on the basis of a file cache capacity as well. The file cache capacity is the maximum capacity capable of storing page information in the assigned range. An equal file cache capacity may be used for all nodes Nn or different file cache capacities may be individually set for different nodes Nn according to the capacity of a hard disk or the like of the nodes Nn. The file cache capacity is an example of a storage capacity.

The assigned range will be described in detail below with respect to an example in which node IDs are 4-digit quaternary numbers and content IDs are used as indexes and search keys for contents. Contents IDs are also 4-digit quaternary numbers.

The node IDs and the content IDs are in the same ID space as stated above. That is, node IDs and the indexes of contents can take on values in the same range. Therefore, when a node ID is inserted in catalog information as a search key, pieces of page information along the path from the position where the node ID is inserted to the root page information inevitably fall in the assigned range. Furthermore, on the path from the position where the node ID is inserted to the root page information, the total file size of all pieces of page information included in a sub-tree with a certain piece of page information at the top is determined. If the determined total file size is less than or equal to the file cache capacity, all pieces of page information included in the sub-tree fall in the assigned range. The total file size has been set in each piece of page information. In each piece of page information, the total file size of all pieces of page information included in a sub-tree with that page information at the top has been set. For example, the total file size of all pieces of page information has been set in the root page information. The file size of leaf page information has been set in the leaf page information itself. The total file size is an example of total data amount. The pieces of page information included in a sub-tree are the piece of page information at the top of the sub-tree and pieces of page information associated with one another from the piece of page information down to leaf page information.

Figure 3:
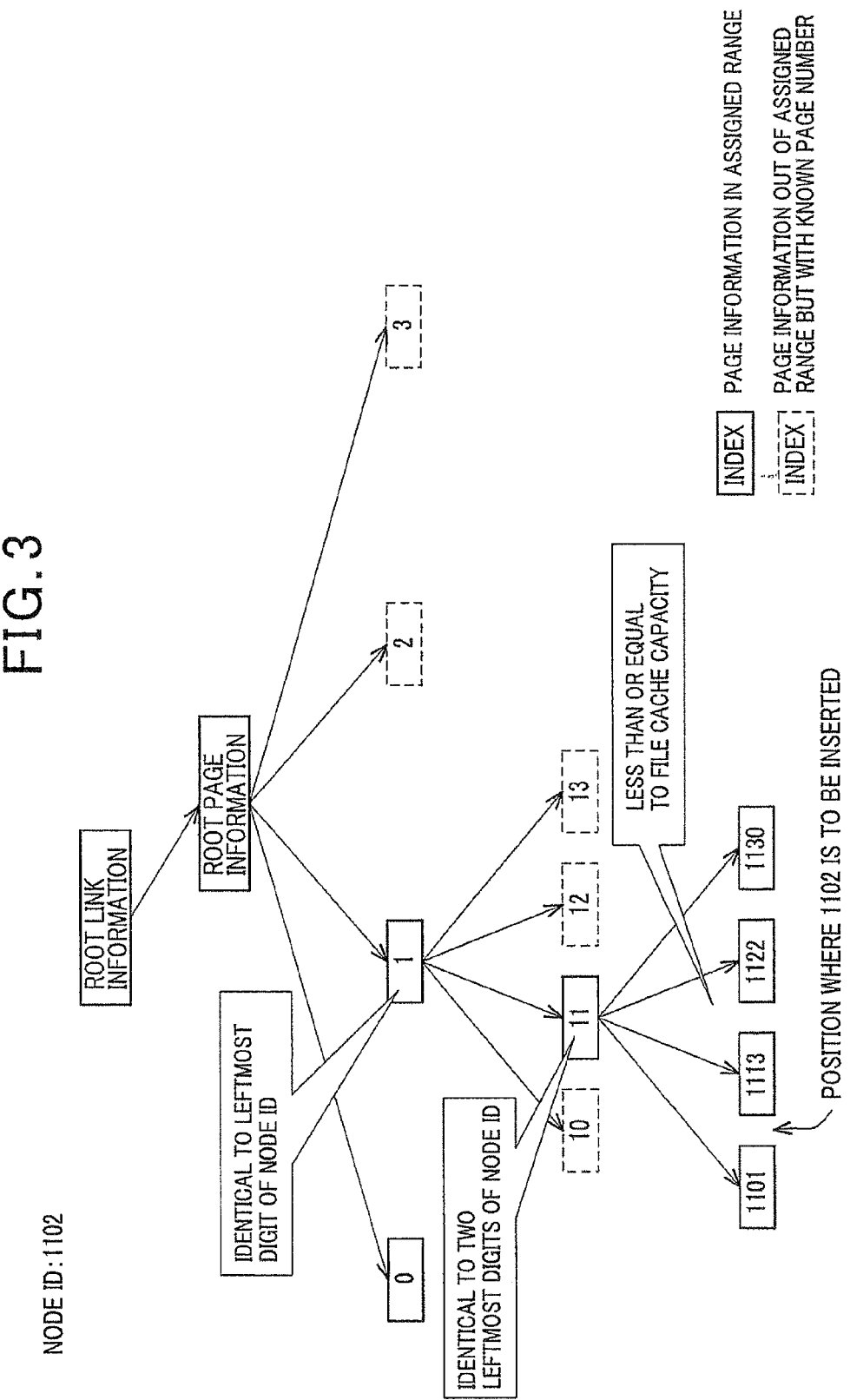
FIG. 3 is a diagram illustrating an exemplary range of page information assigned to a node Nn.

An example of an assigned range will be described with respect to node ID 1102 as illustrated in FIG. 3. Root link information is essential for retrieving page information. Accordingly, root link information is distributed from the server SA to all nodes Nn. In the present embodiment, the root page information is inevitably included in the path from the position where a node ID is inserted to the root page information whatever value the node ID has. Therefore, it is assumed in the present embodiment that the root page information is included in the assigned range. The pieces of page information in the assigned range are indicated by solid-line boxes in FIG. 3.

From the link information contained in root page information, it can be found that the root page information has child page information having an index with the leftmost digit "0", child page information having an index with the leftmost digit "1", child page information having an index with the leftmost digit "2", and child page information having an index with the leftmost digit "3", for example. If the total file size of all pieces of page information contained in the sub-tree with the root page information at the top is greater than the file cache capacity, for example, the all pieces of information included in the sub-tree cannot be specified as an assigned range. Therefore, an assigned range of page information is selected from the child page information of the root page. Specifically, since the leftmost digit of the node ID is 1, child page information having an index with the leftmost digit "1" which matches the leftmost digit of the node ID is included in the assigned range. On the other hand, child page information with "0", child page information with "2", and child page information with "3" are not included in the assigned range. Pieces of page information that are not in the assigned range are indicated by dash-line boxes in FIG. 3.

From link information contained in the page information with "1", it can be found that the page information with "1" has child page information having an index with the two leftmost digits "10", child page information having an index with the two leftmost digits "11", child page information having an index with the two leftmost digits "12", and child page information having an index with the two leftmost digit "13". If the total file size of all pieces of page information included in the sub-tree with the page information with "1" at the top is greater than the file cache capacity, for example, page information to be included in the assigned range is selected from child page information of the page information with "1". Since the two leftmost digits of the node ID is "11", page information having an index with the two leftmost digits "11" which match the two leftmost digits of the node ID is included in the assigned range. On the other hand, the child page information with "10", the child page information with "12" and the child page information with "13" are not included in the assigned range.

From link information contained in the page information with "11", it can be found that the page information with "11" has child page information having an index "1101", child page information having an index "1113", child page information having an index "1122", and the child page information having an index "1130". These pieces of child page information are leaf page information. Here, the page information with node ID 1102 is inserted between page information with node ID "1101" and page information with node ID "1113". If the total file size of all pieces of page information included in the sub-tree with the page information with "11" at the top is less than or equal to the file cache capacity, for example, all the pieces of page information included in the sub-tree is included in the assigned range. Specifically, the page information with "1101", the page information with "1113", the page information with "1122", and the page information with "1130" are included in the assigned range.

Consequently, the node Nn with node ID 1102 is assigned the root page information and the page information with "1", "11", "1101", "1113", "1122" and "1130". The node Nn with node ID 1102 acquires and holds the page information in the assigned range from the server SA or other nodes Nn.

Ranges assigned to other nodes Nn are determined according to the same rules. According to the rules, besides the root page information, ranges assigned to different nodes Nn can overlap each other.

Record search performed by a node Nn and a method for acquiring page information in the search will be described below.

Figure 4:
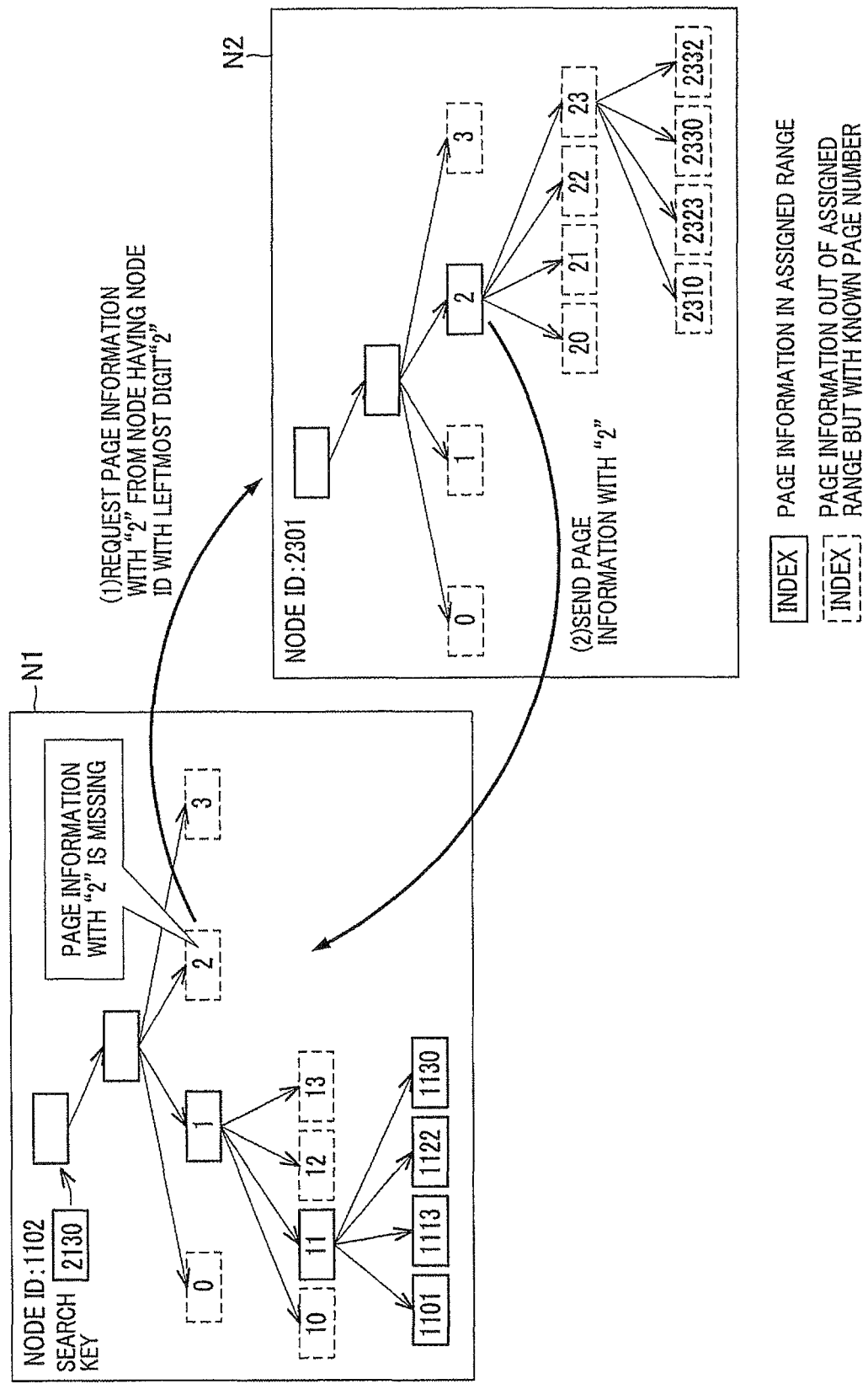
FIG. 4 is a diagram illustrating how a node Nn acquires page information in search for a record.
Figure 5:
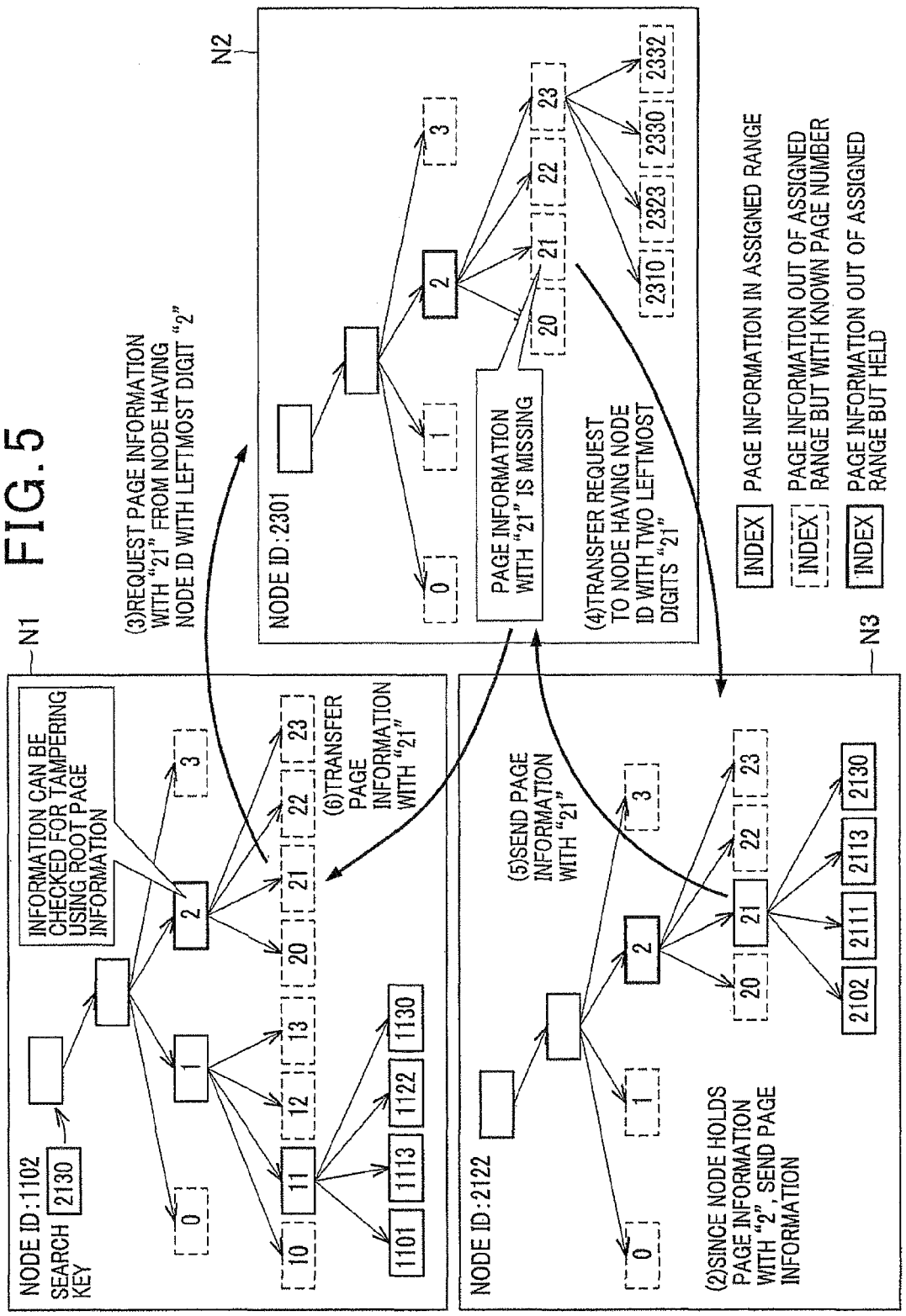
FIG. 5 is a diagram illustrating how a node Nn acquires page information in searching for a record.
Figure 6:
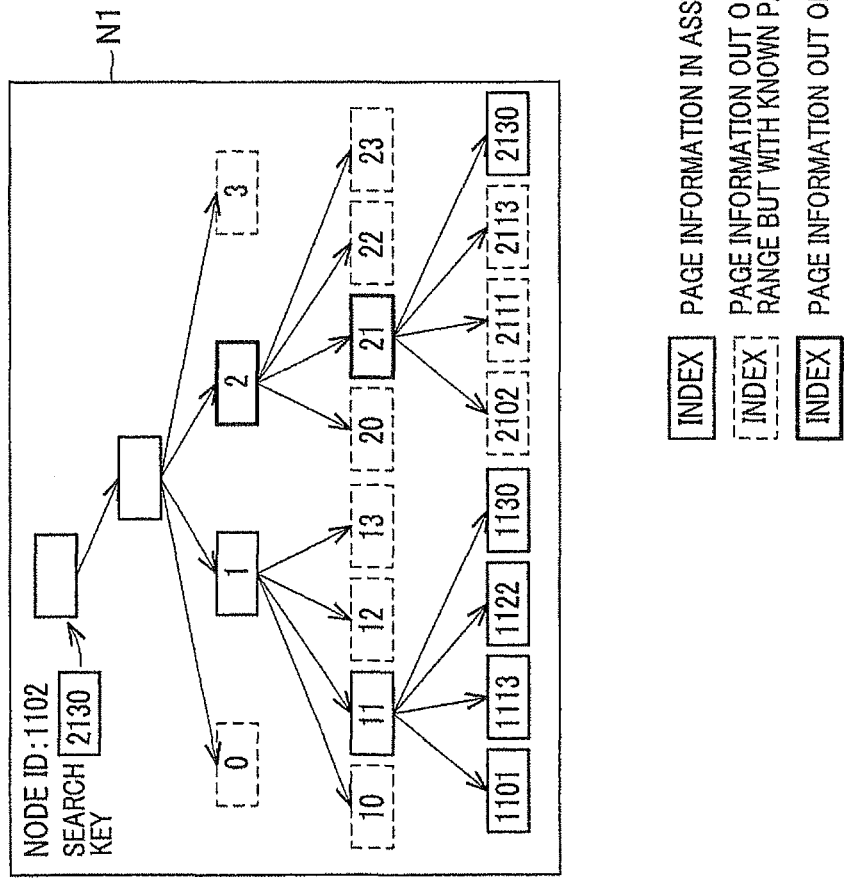
FIG. 6 is a diagram illustrating how a node Nn acquires page information in search for a record.

It is assumed here that node N1 with node ID 1102 searches for a record with content ID 2130 as illustrated in FIGS. 4 through 6. First, root page information pointed to by root link information is referred to. The root page information has child page information with "0", "1", "2" and "3". Since the leftmost digit of the content ID is 2, page information with "2" needs to be referred to next. However, the page information with "2" is not in the range assigned to node N1 and node N1 does not hold the information with "2". Therefore, node N1 has to acquire the page information with "2" from another node.

In this case, node N1 requests the page information with "2" from a node Nn that is more eligible to be assigned the page information with "2" than node N1 among nodes Nn known to node N1 (1). The nodes Nn known are nodes Nn with node page information registered in the routing table. The request for the page information with "2" is made by sending a page information request message. The page information request message contains information such as the page number of the page information with "2" and content ID 2130 which is the search key. The node Nn more eligible to be assigned the page information than node N1 is a node Nn with a node ID having more leftmost digits that match the leftmost digits of the content ID than that of node N1. In the example in FIG. 4, a node Nn having a node ID with the leftmost digit 2 which is identical to the leftmost digit of the content ID is selected as the node Nn more eligible to be assigned the page information with "2" than node N1, for example. That is, node N2 with node ID 2301 is selected in the example in FIG. 4. If there is not a node Nn that is more eligible to be assigned the page information with "2" than node N1, node N1 sends a request to the server SA.

Node N2, which received the request from node N1, holds the page information with "2" in its assigned range. Therefore, node N2 sends the page information with "2" to node N1 (2). Node N1 then holds the page information with "2" as depicted in FIG. 5. In FIG. 5, pieces of page information that are not included in the range assigned to each node but is held by the node are indicated by thick-solid-line boxes. Since a message digest of the page information with "2" is set in the root page information, the message digest can be used to check to see whether the page information with "2" has been tampered or not.

The page information with "2" has pieces of child page information with "20", "21", "22" and "23". Since the two leftmost digits of the content ID are 21, page information with "21" is to be referred to next. Node N1 does not hold the page information with "21". Therefore, again, node N1 requests the page information with "21" from node N2 whose content ID has the leftmost digit 2 which is identical to the leftmost digit of the content ID (3).

Node N2, which received the request from node N1, is not assigned the page information with "21" as its assigned range and also does not hold the page information with "21". In this case, the request is transferred to another node Nn. Specifically, node N2 transfers the page information request message to a node Nn that is more eligible to be assigned the page information with "21" than node N2 among nodes Nn known to node N2 to request the node Nn to send the page information with "21" (4). For example, a node Nn with a node ID having the two leftmost digits 21, which are identical to the two leftmost digits of the content ID, is selected. In the example in FIG. 5, node N3 with node ID 2122 is selected.

Node N3, which received the request transferred from node N2, holds the page information with "21" in its assigned range. Therefore, node N3 sends the page information with "21" to node N2 (5). Node N2 in turn transfers the page information with "21" to node 1 (6). The page information may be directly sent from node N3 to node N1.

In this way, the page information request message is transferred from one node Nn to another until the message reaches the node Nn that holds the requested page information. If a node Nn that is most eligible to be assigned the requested page information does not hold the requested page information, the page information request message is transferred to the center server SA.

The page information with "2130" is also acquired in the same way. Since the page information contains a record with the index value 2130, the search is completed. As a result, node N1 newly holds pieces of page information with "2", "21" and "2130" as illustrated in FIG. 6. These pieces of page information which are not in the assigned range may or may not be deleted after they are retrieved and required processing on them is completed. Page information that is not included in the assigned range may be deleted according to an LRU (Least Recently Used) algorithm, for example.

The page information does not contain an index in the example described above. Another example in which page information contains an index will be described below in addition.

In this case, first a search key is compared with one or more indexes contained in the root page information pointed to by root link information. Comparison between the search key and the index or indexes in magnitude shows in which range of index values the search key value falls. For example, if an index is a numeric value, the numeric value of the search key is compared with the numeric value of the index in magnitude. First, link information contained in the root page information in association with the range of the index values is referred to. Then, pieces of child page information of the root page information that are pointed to by the link information are referred to. The search key is compared with index values of the pieces of child page information in magnitude as with the root page information. In this way, search is performed along the path from the root page information to leaf page information. When the leaf page, which also contains one or more indexes associated with a record or records, is reached, the search key is compared with the index or indexes. If an index value matches the search key value, the record associated with the index is the record to be retrieved.

4. Distribution of Page Information

Each node Nn acquires page information in the range assigned to the node Nn from the center server SA or another node Nn in advance as described above. When each node Nn searches for a record, the node Nn acquires required page information from the center server SA or another node Nn. When a node Nn wants to acquire page information, the node Nn accesses another node Nn in preference to the center server SA. However, if page information has been updated, only the center sever SA holds the new, updated version of the page information. Therefore, many nodes Nn can access the center server SA to acquire the updated page information, thereby increasing the load on the center server SA.

To prevent this, in the present embodiment, when the center server SA generates new page information, the center server SA distributes the generated page information to nodes Nn that are assigned a range including the generated page information.

For example, the center server SA sends the generated page information to a node Nn that is likely to be assigned a range in which the generated page falls among the nodes Nn known to the center server SA. A node Nn that is likely to be assigned the generated page may be a node Nn that is most eligible to be assigned the page information among the nodes Nn with node page information registered in the routing table of the center server SA. A node Nn that is most eligible to be assigned the page information is a node Nn that has a node ID value closest to the value of the index value of the page information, for example. A node ID value is closest to an index value if more leftmost digits of the node ID value match those of the index value.

The node Nn receives the page information and, if there is another node Nn that is more eligible to be assigned the received page information than the node Nn among the nodes Nn known to the node Nn, transfers the received page information to that node Nn. In this way, page information is transferred to a node Nn eligible to be assigned the page information. In the course of transferring the page information, the page information is stored in each node Nn along the transfer path.

As a result, the updated, new page information is held by at least one of the nodes Nn that are assigned the page information. Nodes Nn that have not received the page information can acquire the page information from a node Nn to which the page information is assigned. Therefore, access traffic to the center server SA can be reduced.

5. Configuration and Functions of Center Server SA

Figure 7:
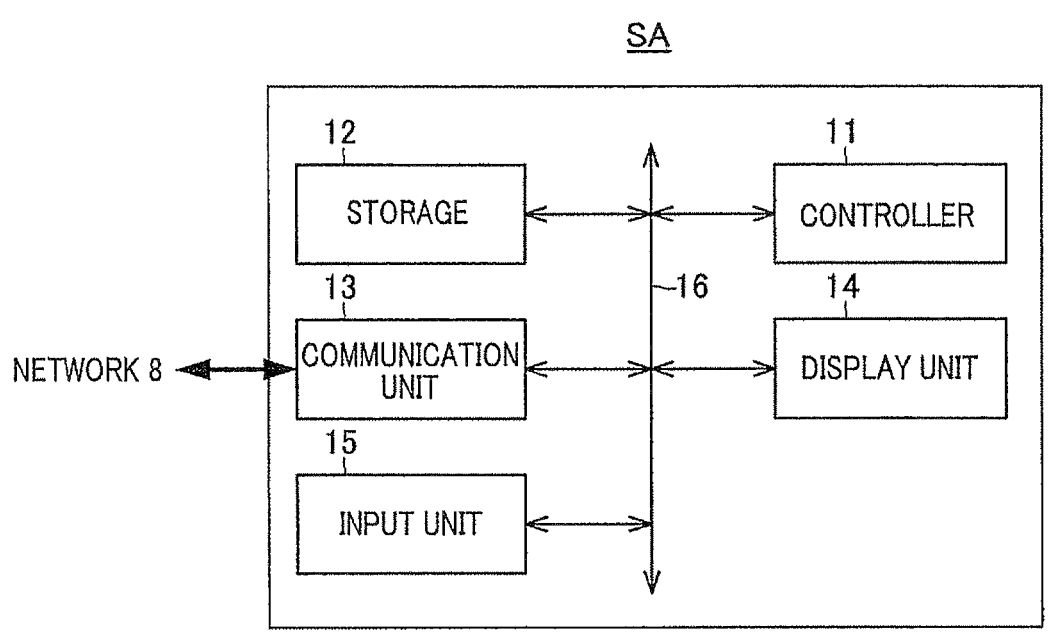
FIG. 7 is a diagram schematically illustrating an exemplary configuration of a center server SA according to one embodiment.

A configuration and functions of the center server SA will be described below with reference to FIG. 7. The center server SA includes a controller 11 including a CPU which has a computing function, a working RAM, and a ROM storing various kinds of data and programs as illustrated in FIG. 7. The center server SA also includes a storage 12 such as a hard disk for storing various kinds of data and programs. The center server SA also includes a communication unit 13 which controls information communication with nodes Nn through the network 8. The center server SA further includes a display unit 14 such as a CRT or LCD display which displays various kinds of information. The center server SA also includes an input unit (for example a keyboard and a mouse) 15 which receives an instruction from an operator and provides an instruction signal according to the instruction to the controller 11. The controller 11, the storage 12, the communication unit 13, the display unit 14, and the input unit 15 are interconnected through a bus 16 as depicted in FIG. 7. Here, the storage 12 is an example of a page information storage device, an address information storage device and an assigned range information storage device in the present invention. The storage 12 may be a volatile memory or a non-volatile memory.

A DHT-based routing table is stored in the storage 12. Node information about at least some of the nodes Nn participating in the distributed content storage system S is registered in the routing table. Node IDs contained in the node information is an example of assigned range information. IP addresses contained in the node information are an example of address information. The node ID, IP address, and port number of each node Nn is stored in the storage 12. A catalog database is built in the storage 12 in which catalog information of each piece of root link information and page information is registered. A database management program for managing the catalog database is also stored in the storage 12. The database management program is an example of a page information sending program. The database management program is an example of an information generation program as well.

When page information is generated, the controller 11 sets in the page information to be generated the total file size of all pieces of page information included in a sub-tree with the page information to be generated at the top. In each piece of child page information of the page information to be generated, the total file size of all pieces of page information included in a sub-tree with the child page information at the top is set. From the set information; the total file size of all pieces of page information included in sub-trees including the child page information and page information below the child page information can be calculated. By adding the file size of the page information to be generated, the total file size can be acquired.

When new root link information is generated, the controller 11 distributes the generated root link information to all nodes Nn participating in the distributed content storage system S. The distribution may be performed by overlay-multicast, for example.

When a record is searched for, the controller 11 determines assigned page information on the basis of a search key input through the input unit 15 and an index set in node page information. When a record is searched for, leaf page information containing the searched record corresponding to the input search key is assigned page information. If the determined assigned page information contains the searched record, the controller 11 presents information about the searched record to the operator.

In the controller 11, the CPU reads and executes programs such as the database management program stored in the storage 12.

The database management program may be downloaded from a given server on the network 8 or may be stored on a recording medium such as a CD-ROM and read from the recording medium through a recording medium drive.

6. Configuration and Functions of Node Nn

Figure 8:
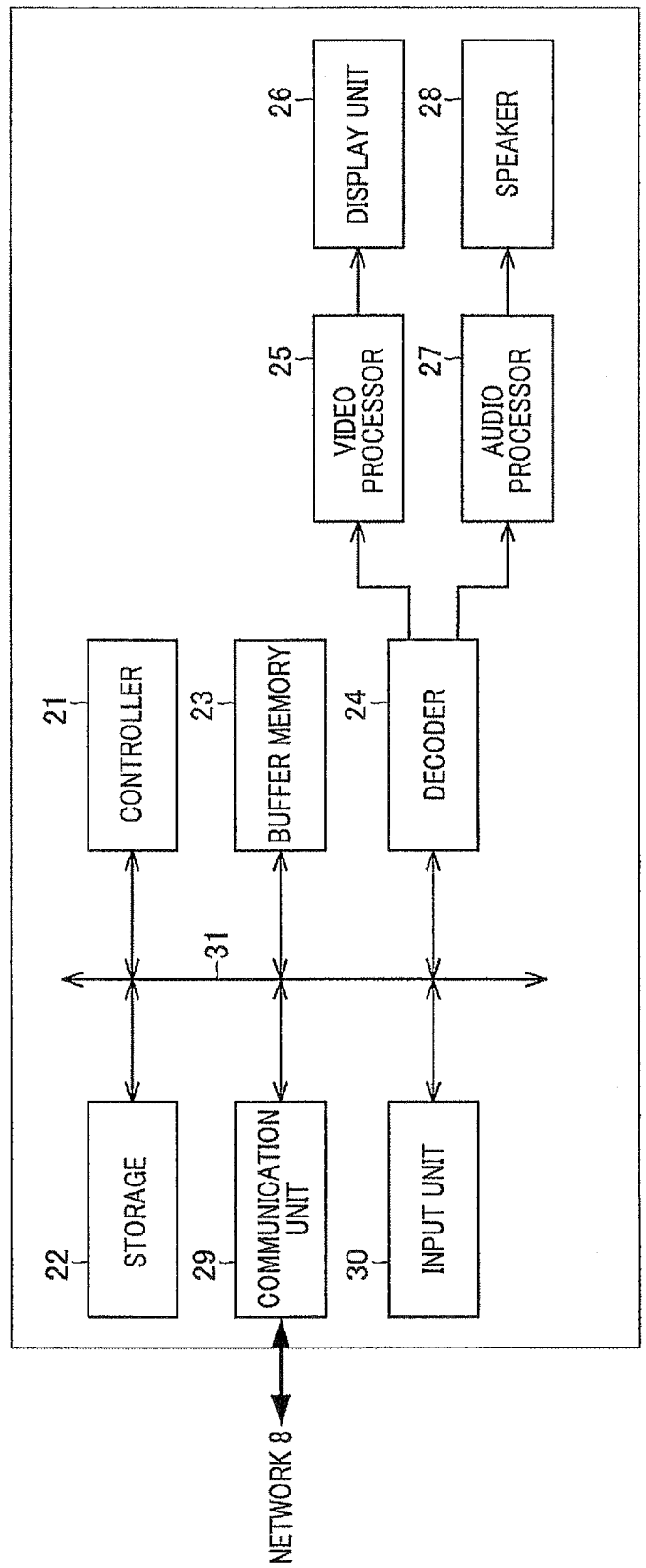
FIG. 8 is a diagram schematically illustrating an exemplary configuration of a node Nn according to one embodiment.

A configuration and functions of a node Nn will be described below with reference to FIG. 8. Each node Nn includes a controller 21 which is a computer including a CPU which has a computing function, a working RAM, and a ROM which stores various kinds of data and programs as illustrated in FIG. 8. Each node Nn includes a storage 22 which may be a hard disk for storing various kinds of data and programs, and a buffer memory 23 for temporarily storing a replica of a received content. Each node Nn further includes a decoder 24 which decodes encoded video data (video information) and audio data (audio information) contained in a replica of a content. Each node Nn further includes a video processor 25 which applies predetermined image processing to the encoded video data and outputs a video signal and a display unit 26 such as a CRT or LCD display which displays a video based on the video signal output from the video processor 25. Each node Nn further includes an audio processor 27 which digital-to-analog converts the encoded audio data to an analog audio signal, then amplifies the analog audio signal with an amplifier and outputs the amplified analog signal, and a speaker 28 which outputs the audio signal output from the audio processor 27 as an acoustic wave. Each node Nn further includes a communication unit 29 which controls information communication with other nodes Nn through the network 8. Each node Nn further includes an input unit (for example, a keyboard, mouse, remote control, operation panel and the like) 30 which receives an instruction from a user and provides an instruction signal according to the instruction to the controller 21. The controller 21, the storage 22, the buffer memory 23, the decoder 24, the communication unit 29, and the input unit 30 are interconnected through a bus 31 as illustrated in FIG. 8. Here, the storage 12 is an example of a page information storage device, an address information storage device, and an assigned page information storage device in the present invention. The node Nn may be a personal computer, a set top box, or the like.

A DHT-based routing table and an index are stored in the storage 22. Also stored in the storage 22 is the IP address and port number of a contact node to be accessed by a node Nn when the node wants to participate in the distributed content storage system S and the IP address and port number of the center server SA. IP addresses registered in the routing table are an example of address information. A node ID of the node Nn itself is also stored in the storage 22. The node ID is an example of assigned range information. Page information that the node Nn acquired from another node Nn and page information distributed from the center server SA are stored in the storage 22 as files.

In the controller 21, the CPU reads and executes programs (including a node program of the present invention) stored in the storage 22.

The controller 21 searches for a record of a content. The search method is the same as the method for searching a record performed by the center server SA. However, if required page information is not held in the node Nn, the controller 21 acquires the page information from the center server SA or another node Nn. The controller 21 performs required processing based on the retrieved record. For example, the controller 21 causes the display unit 26 to display information of the record, determines whether the content has been published or not, and acquires the content from a content holding node on the basis of the content ID contained in the record.

The node program may be downloaded from a given server on the network 8 or may be stored on a recording medium such as a CD-ROM and read from the recording medium through a recording medium drive.

7. Operations of Distributed Content Storage System S

Operations of the distributed content storage system S according to the present embodiment will be described below with reference to FIGS. 9 through 17.

It is assumed in the following description that catalog information has a typical n-ary search tree structure. Description of processing that is typical of the type of the tree and structure will be omitted. Description of processing relating to self-link information which is not essential to page information will also be omitted.

[7.1 Operations of Center Server SA]

Figure 9:
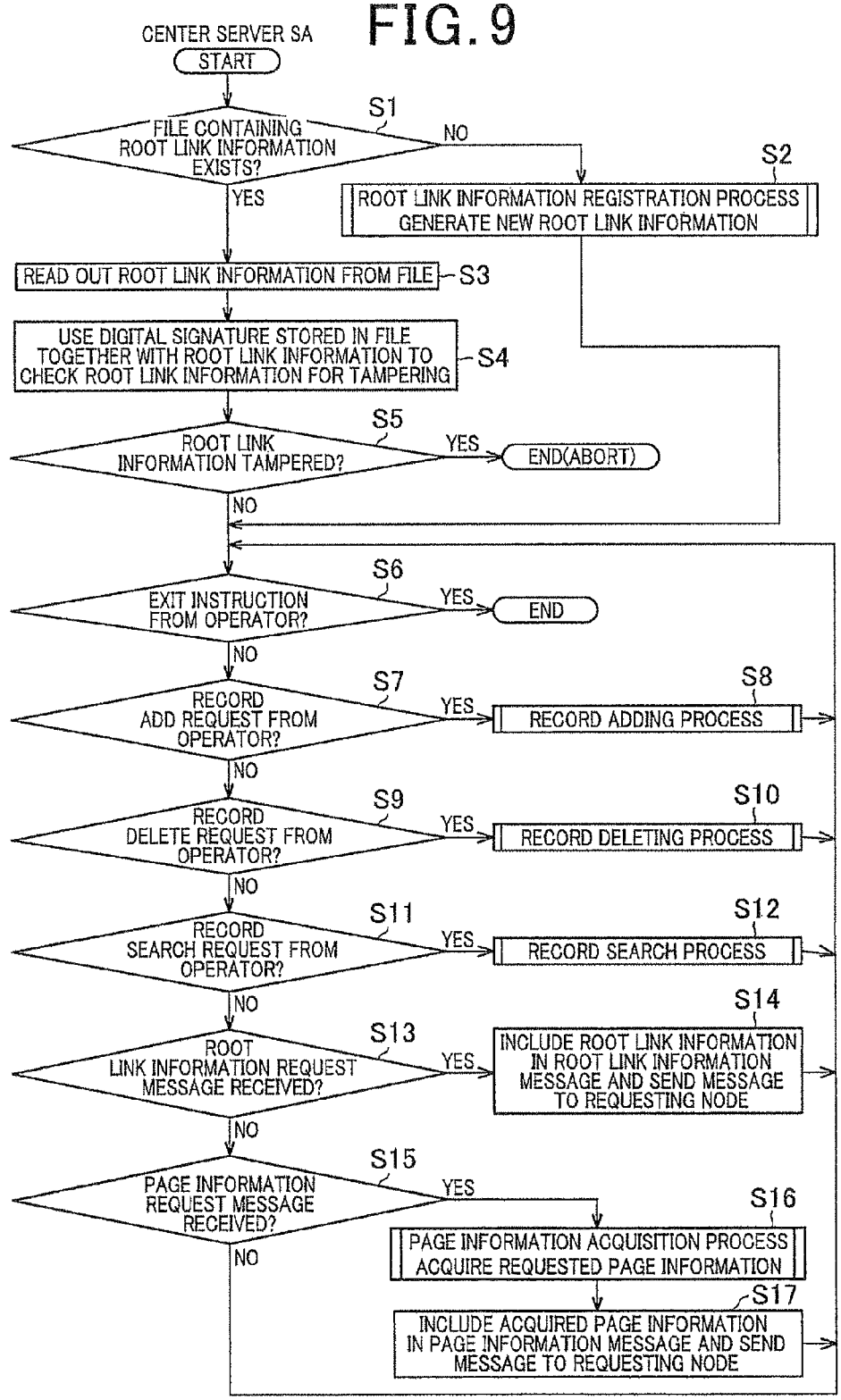
FIG. 9 is a flowchart illustrating an exemplary process performed by a controller 11 in the center server SA according to one embodiment.

A process illustrated in FIG. 9 is started for example when a database management program is activated. First, the controller 11 performs an initialization process at steps S1 through S5. Specifically, the controller 11 determines whether or not a file containing root link information is stored in the storage 12 (step S1). When the database management program is activated for the first time, root page information has not yet been generated by the controller 11. On the other hand, when the database management program has been activated for the second or subsequent time, root link information has been already generated and stored in a file. If a file containing root link information is not stored in the storage 12 (step S1: NO), the controller 11 performs a root link information registration process (step S2). In the root link information registration process following the initialization process, the controller 11 newly generates root link information and root page information. Detailed description of the root link information registration process will be omitted.

If the controller 11 determines at step S1 that a file containing root link information is stored in the storage 12 (step S1: YES), the controller 11 reads the root link information from the file and stores the link information in the RAM (step S3).

The controller 11 then uses a digital signature contained in the file to check the root page information for tampering (step S4). For example, the controller 11 computes a message digest from the root link information, in particular, from a serial number and a message digest of the root page information. A hash function set in the digital signature is used for the computation of the message digest. The controller 11 uses a public key set in certificate information of the digital signature to decrypt the signature value of the digital signature. The controller 11 then determines whether or not the generated message digest matches the decoded data. If they match, the root link information is considered to have not been tampered; if they do not match, the root link information is considered to have been tampered.

Then, the controller 11 determines whether or not the root link information has been tampered (step S5). If the root link information has been tampered (step S5: YES), the controller 11 aborts the process. In that case, for example an error message indicting that the root link information has been tampered is displayed on the display unit 14 and execution of the database management program is aborted.

If the controller 11 determines at step S5 that the root link information has not been tampered (step S5: NO) or when the controller 11 has completed the root link information registration processing at step S2, the controller 11 starts a main process.

First, the controller 11 determines on the basis of an input from the input unit 15 whether or not an instruction to exit the process has been issued by an operator (step S6).

If the instruction to exit the process has not been issued at step S6 (step S6: NO), the controller 11 determines on the basis of an input from the input unit 15 whether or not addition of a record has been requested by the operator (step S7). If addition of a record has been requested (step S7: YES), the controller 11 performs a record adding process (step S8). In proceeding to do so, the controller 11 specifies a new record input through the input unit 15 by an operator operation, for example. If a search key is additionally required, the controller 11 also specifies a search key for the new record. In the record adding process, the input new record is added to catalog information. The record adding process will be described later in further detail.

If addition of a record has not been requested at step S7 (step S7: NO), the controller 11 determines on the basis of an input from the input unit 15 whether or not deletion of a record has been requested by the operator (step S9). If deletion of a record has been requested (step S9: YES), the controller 11 performs a recode deleting process (step S10). In proceeding to do so, the controller 11 specifies a search key for the record to be deleted which has been input through the input unit 15 by an operator operation. In the record deleting process, the record to be deleted that corresponds to the specified search key is deleted from the catalog information. The record deleting process will be described later in further detail.

If deletion of a record has not been requested at step S9 (step S9: NO), the controller 11 determines on the basis of an input from the input unit 15 whether or not search for a record has been requested by the operator (step S11). If search for a record has been requested (step S11: YES), the controller 11 performs a record search process (step S12). In proceeding to do so, the controller 11 specifies a search key input from the input unit 15 by an operator operation. In the record search process, the catalog information is searched for the record corresponding to the specified search key. The record search process will be described later in further detail.

If search for a record has not been requested at step S11 (step S11: NO), the controller 11 determines whether or not a root link information request message has been received (step S13). If a root link information request message has been received (step S13: YES), the controller 11 includes root link information in a root link information message and sends the root link information message to the requesting node Nn.

If a root link information request message has not been received at step S13 (step S13: NO), the controller 11 determines whether or not a page information request message has been received (step S15). If a page information request message has been received (step S15: YES), the controller 11 performs a page information acquisition process (step S16). In proceeding to do so, the controller 11 specifies link information contained in the page information request message. The link information points to the requested page information. In the page information acquisition process, the page information pointed to by the specified link information is acquired from a file and is stored in the RAM. The page information acquisition process will be described later in further detail. After acquiring the requested page information, the controller 11 includes the page information in a page information message and sends the page information message to the requesting node Nn (step S17).

After completion of step S8, S10, S12, S14 or S17 or if a page information request message has not been received at step S15 (step S15: NO), the controller 11 returns to step S6. If an exit instruction is issued by the operator at step S6 (step S6: YES), the controller 11 exits the process.

Figure 10:
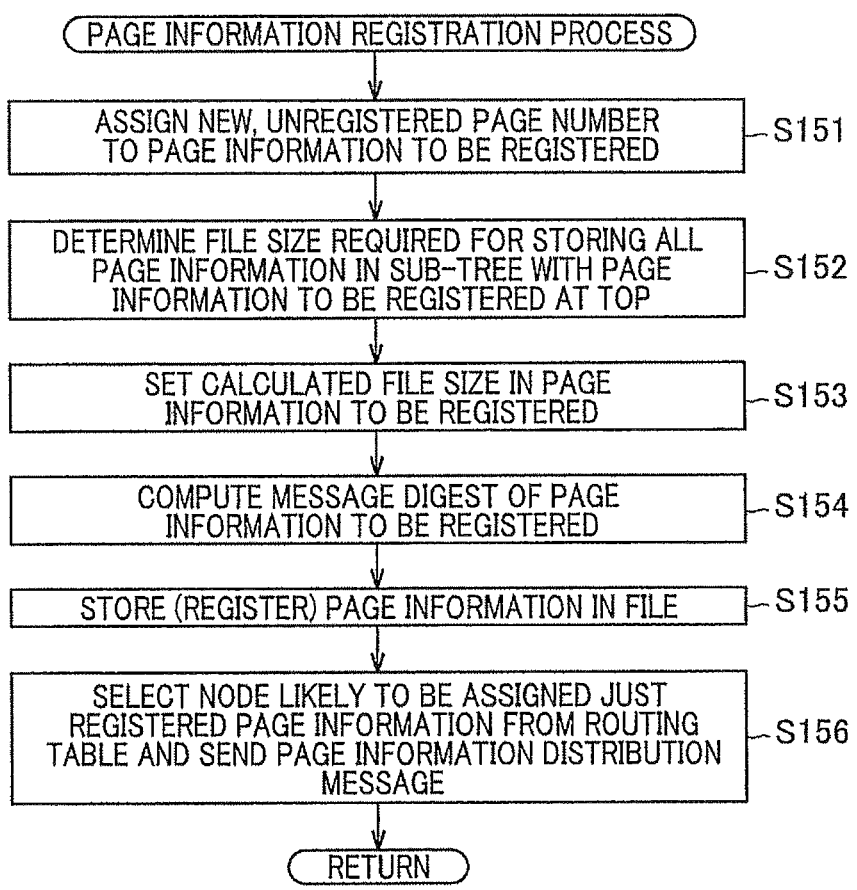
FIG. 10 is a flowchart illustrating an exemplary page information registration process performed by the controller 11 in the center server SA according to one embodiment.

The page information registration process illustrated in FIG. 10 is performed when empty root page information has been generated in the root link information registration process, or when new page information has been generated in the record adding process, or when new page information has been generated in the record deleting process. When the page information registration process is performed, newly generated page information is specified. The newly generated page information is stored in the RAM, for example.

First, the controller 11 assigns a new page number that has not been assigned to any page information to a specified page information to be registered (step S151).

Then, the controller 11 determines a file size required for storing all pieces of page information included in a sub-tree with the page information to be registered at the top (step S152). For example, the controller 11 identifies child page information of the page information to be registered by link information contained in the page information to be registered. After identifying the child page information, the controller 11 acquires a total file size set in each of the pieces of child page information identified. The controller 11 adds the acquired total file sizes together. Finally, the controller 11 determines the file size of the page information to be registered to the sum of the file sizes.

The controller 11 sets the calculated file size in the page information to be registered as the total file size (step S153).

The controller 11 computes a message digest for the page information to be registered (step S154).

The controller 11 stores the page information to be registered in a file (step S155). In doing so, the controller 11 adds the page number, for example, to the file name so that the storage location of the page information can be identified.

The controller 11 then sends a page information distribution message including the registered page information to a node Nn that is likely to be assigned the registered page information (step S156). Specifically, the controller 11 determines a node Nn that is likely to be assigned the registered page information as the destination of the registered page information on the basis of node IDs registered in the routing table. The node Nn that is likely to be assigned the page information is selected from among the nodes Nn with node information registered in the routing table. Then the controller 11 sends the page information distribution message to the node Nn that is likely to be assigned the registered page information. The page information distribution message contains the generated page information. Thus, the controller 11 can distribute the registered page information to the node Nn. The controller 11 determines a node Nn to which the page information is to be sent on the basis of the assigned range of page information that is determined for each node Nn. Accordingly, the registered page information can be distributed to nodes Nn while at the same time the storage load on each node Nn can be reduced. Upon completion of the operation, the controller 11 exits the page information registration process and returns link information including the assigned page number and the computed message digest to the calling process.

Figure 11:
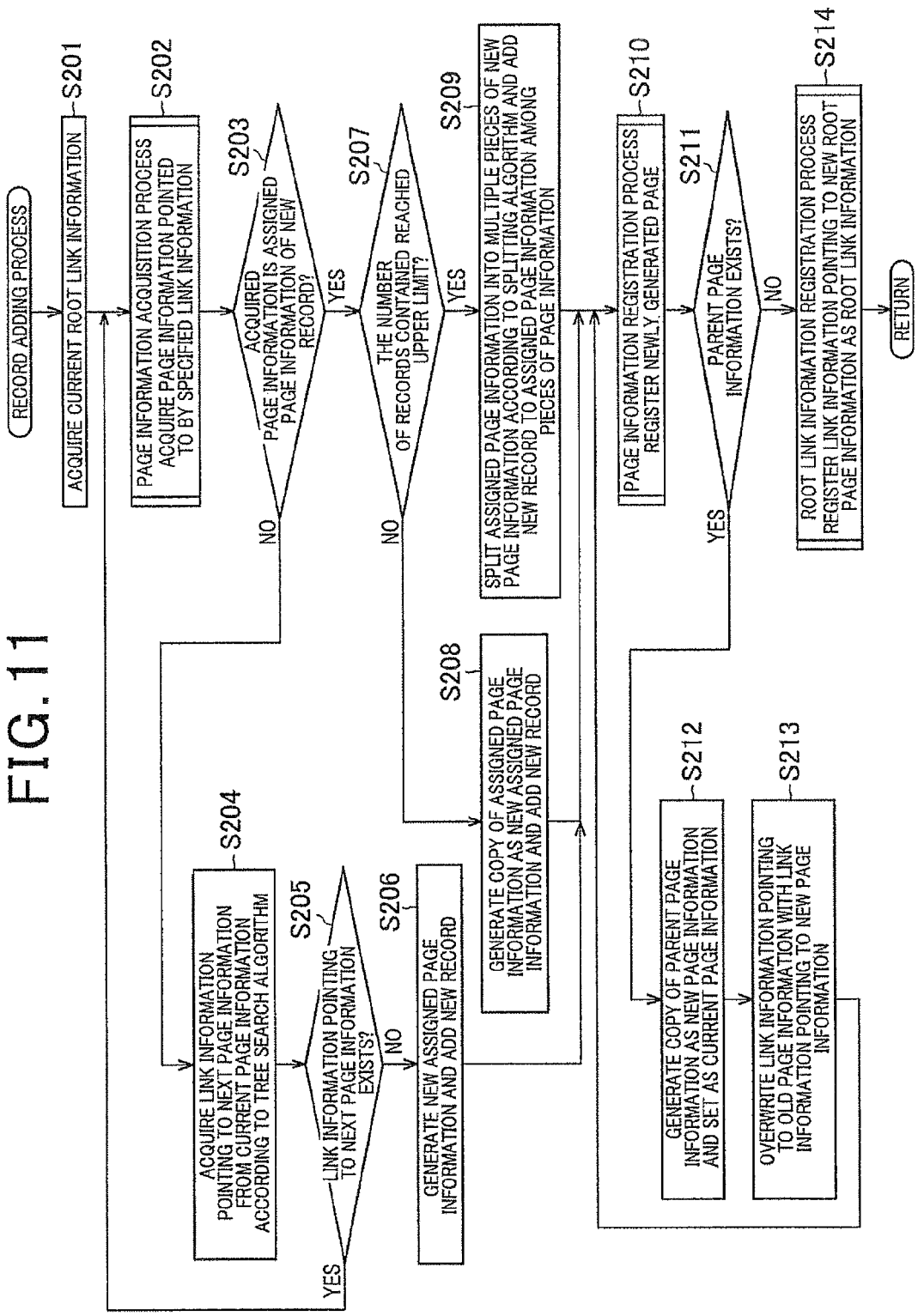
FIG. 11 is a flowchart illustrating an exemplary record adding process performed by the controller 11 in the center server SA according to one embodiment.
Figure 12:
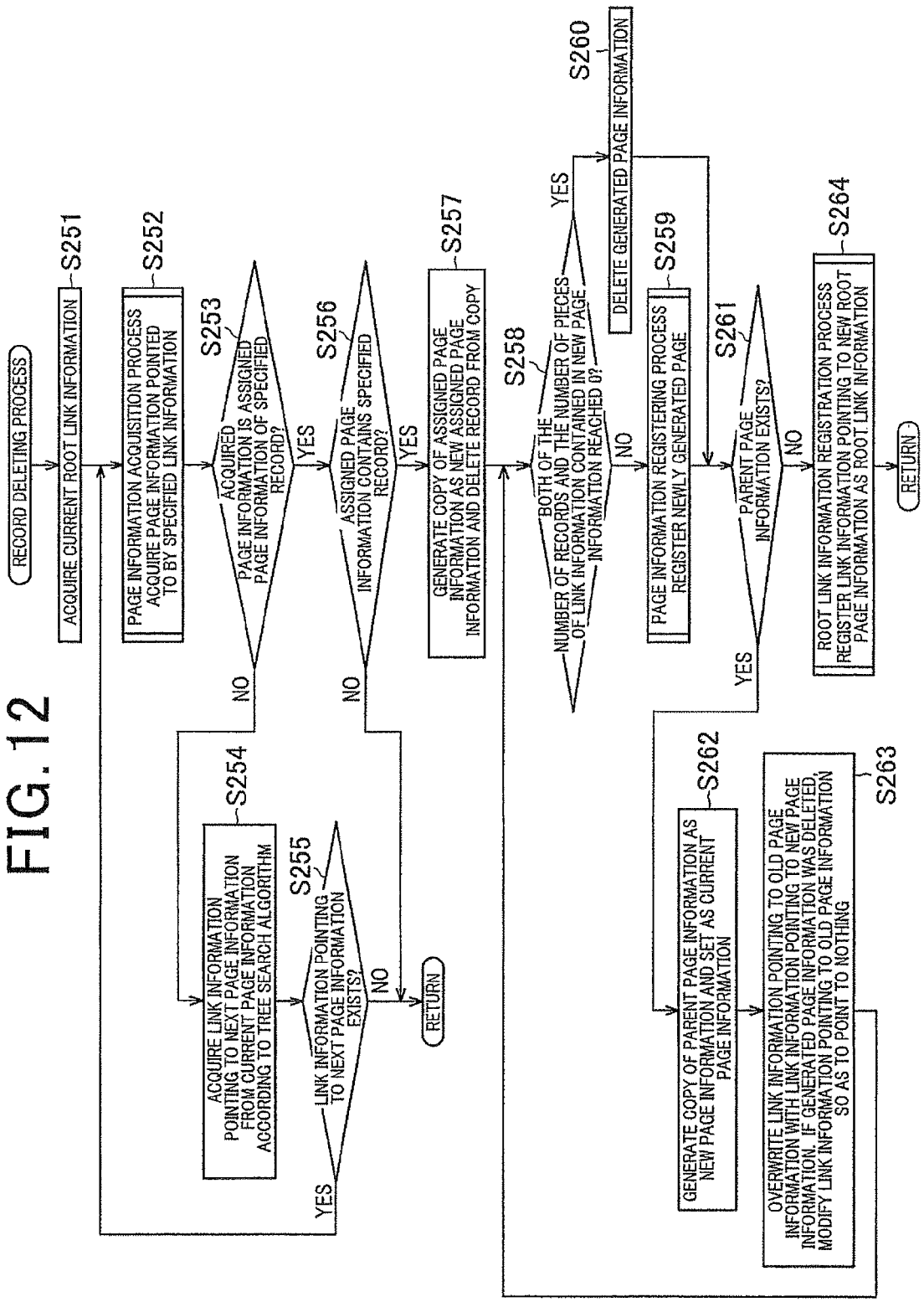
FIG. 12 is a flowchart illustrating an exemplary record deleting process performed by the controller 11 in the center server SA according to one embodiment.

In the record adding process illustrated in FIG. 11, the controller 11 first retrieves the current root link information from the RAM (step S201). Then the controller 11 performs the page information acquisition process (step S202). In proceeding to do so, the controller 11 specifies root link information. In the page information acquisition process, page information pointed to by the specified link information is acquired from the file and is stored in the RAM. The acquired page information becomes the page information currently being referred to. The page information acquisition process will be described later in further detail.

Then, the controller 11 determines whether or not the acquired page information is assigned page information of a new record (step S203). The determination method depends on the structure of the page information.

If the acquired page information is not assigned page information of a new record (step S203: NO), the controller 11 acquires link information pointing to next page information from the page information currently being referred to (step S204). This operation is performed according to a search algorithm appropriate for the structure of the search tree of the catalog information. For example, the controller 11 compares the specified search key with the index set in the current page information being referred to identify the link information pointing to the next page information.

Then the controller 11 determines whether link information pointing to next page information exists or not (step S205). That is, the controller 11 determines whether or not link information pointing to the next page information has been acquired. If link information pointing to the next page information does not exist (step S205: NO), the controller 11 generates new assigned page information on the RAM at step S206. Then the controller 11 adds a new record to the generated assigned page information. In doing so, the controller 11 additionally adds a search key for the new record as an index to the assigned page information in association with the new record if required by the structure of the catalog information.

On the other hand, if link information pointing to the next page information exists (step S205: YES), the controller 11 returns to step S202. The controller 11 specifies the acquired link information and performs the page information acquisition process.

If the controller 11 determines at step S203 that the acquired page information is assigned page information of a new record (step S203: YES), the controller 11 determines whether or not the number of records contained in the assigned page information has reached an upper limit of the number of records that can be contained (step S207). If the upper limit has not been reached (step S207: NO), the controller 11 generates a copy of the content of the current assigned page information on the RAM as new assigned page information at step S208. Then the controller 11 adds a new record to the new assigned page information. If required, the controller adds a search key for the new record as an index as in step S206.

On the other hand, if the number of records has reached the upper limit of records that can be stored (step S207: YES), the controller 11 splits the page information at step S209. Specifically, the controller 11 splits the content of the current assigned page information to generate multiple new pieces of page information on the RAM according to a splitting algorithm appropriate for the structure of the search tree of the catalog information. The controller 11 adds a new record to an assigned piece of page information among the new pieces of page information. For example, if the content of the assigned page information is split into three, the records contained in the original assigned page information are separated into first, second and third groups of records in order of their indexes. Then pieces of page information to contain the records are generated. Which new records are to be contained in which page information is determined on the basis of their search keys. The controller 11 adds the search keys for the new records as indexes if required as in step S206.

After generating the new assigned page information at step S206, S208 or S209, the controller 11 performs page information registration process (step S210). In proceeding to do so, the controller specifies the newly generated page information. In the page information registration process, link information pointing to the specified page information is generated and the page information is stored in a file. Thus, the page information is registered. If the assigned page information is split into multiple new pieces of page information at step S209, the page information registration process is performed for each of the multiple pieces of page information.

The controller 11 then determines whether or not the registered page information has parent page information (step S211). For example, whenever it is determined at step S205 that link information pointing to next page information exists, the page number of the page information referred to at that time may be stored in a predetermined area in the RAM. By referring to the area, determination can be made whether parent page information exists or not and if parent page information exists, the page number of the parent page information can be identified.

If the registered page has parent page information (step S211: YES), the controller 11 updates the page numbers and message digests of pieces of node page information along the path from the parent page information of the new assigned page information to the root page information at steps S212 and S213. First, the controller 11 generates a copy of the parent page information on the RAM as new parent page information (step S212). Then, the controller 11 sets the new parent page as the current page information to be referred to.

The controller 11 then overwrites the link information pointing to old child page information contained in the current page information being referred to with link information pointing to new child page information (step S213). Specifically, the controller 11 sets the link information generated in the page information registration process at step S210 as the link information pointing to the new child page information. The controller 11 then overwrites the link information pointing to the old child page information with the link information pointing to the new child page information.

Then the controller 11 returns to step S210, where the controller 11 specifies the newly generated page information currently being referred to and performs the page information registration process. As a result, the page information currently being referred to is registered.

On the other hand, if the registered page information does not have parent page information at step S211, that is, if the registered page information is root page information (step S211: NO), the controller 11 performs a root link information registration process (step S214). In the root link information registration process, root link information pointing to the new registered root page information is generated. Upon completion of the root link information registration process, the controller 11 exits the record adding process. In the record deleting process illustrated in FIG. 12, first the controller 11 performs operations at steps S251 through S255. Operations at these steps are the same as those at steps S201 through S205 in the record adding process.

If the controller 11 determines at step S255 that there is not link information pointing to next page information (step S255: NO), the controller 11 exits the record deleting process. That is, since there is not page information containing a record to be deleted, the record deletion process will end here.

If the controller 11 determines at step S253 that the acquired page information is assigned page information of the record to be deleted (step S253: YES), the controller 11 determines whether or not the assigned page information contains the record to be deleted (step S256). The method for making the determination depends on the structure of the catalog information. For example, in the case of a structure in which a record is associated with an index of the record and contained in page information, the index contained in the assigned page information is searched for by using a specified search key. If an index that matches the specified search key is found, it is determined that the record to be deleted is contained in the assigned page information. On the other hand, if an index that matches the specified search key is not found, it is determined that the record to be deleted is not contained in the assigned page information. If the record to be deleted is not contained in the assigned page information (step S256: NO), the controller 11 exists the record deleting process.

On the other hand, if the assigned page information contains the record to be deleted (step S256: YES), the controller 11 generates a copy of the current assigned page information on the RAM as new assigned page information. The controller 11 then deletes the record to be deleted from the new assigned page information. If an index of the record deleted is set in the assigned page information, the controller 11 deletes the index as well.

Then the controller 11 determines whether or not both of the number of records and the number of pieces of link information contained in the newly generated page information has reached 0 (step S258). That is, the controller 11 determines whether or not the generated new page information has become empty. If the generated new page information has not become empty (step S258: NO), the controller 11 specifies this page information and performs the page information registration process (step S259). As a result, the new page from which the record to be deleted has been deleted is registered.

On the other hand, if the generated new page information has become empty (step S258: YES), the controller 11 deletes the page information from the RAM (step S260).

After completion of the operation at step S259 or S260, the controller 11 performs operations at steps S261 through S264. The operations at these steps are basically the same as the operations at steps S211 through S214.

At step S263, the controller 11 overwrites the link information pointing to old child page information contained in the page information currently being referred to with link information pointing to new child page information. However, if child page information has been deleted at step S260, the controller 11 modifies the link information pointing to old child page information so as to point to nothing. For example, the controller 11 sets null values as the page number and message digest.

Figure 13:
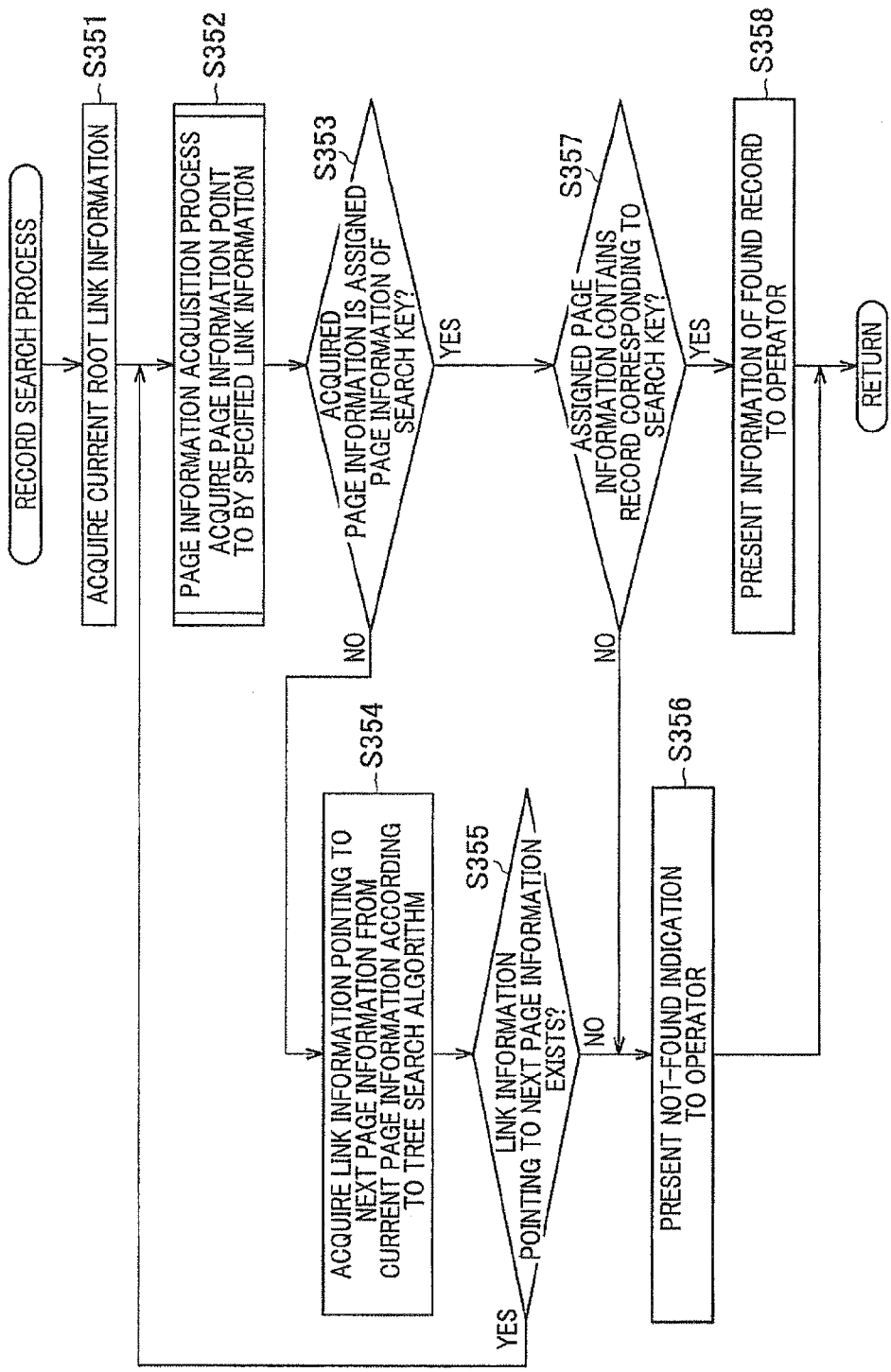
FIG. 13 is a flowchart illustrating an exemplary record search process performed by the controller 11 in the center server SA according to one embodiment.

In the record search process illustrated in FIG. 13, first the controller 11 retrieves current root link information from the RAM (step S351). Then the controller 11 performs a page information acquisition process (step S352). The controller 11 then determines whether or not acquired page information is assigned page information of the record corresponding to a specified search key (step S353). If the acquired page information is not the assigned page information of the record to be deleted (step S353: NO), the controller 11 acquires link information pointing to next page information from the page information currently being referred to (step S354). The controller 11 then determines whether or not there is link information pointing to next page information (step S355). If there is not link information pointing to next page information (step S355: NO), the controller 11 presents to the operator an indication that no record corresponding to the specified search key has been found (step S356). For example, a message indicating that no record has been found is displayed on the display unit 14.

If the controller 11 determines at step S353 that the acquired page information is assigned page information of the record corresponding to the search key (step S353: YES), the controller 11 determines whether or not the assigned page information contains a record corresponding to the search key (step S357). If the assigned page information does not contain a record corresponding to the search key (step S357: NO), the controller 11 presents an indication that no record that corresponds to the specified search key has found to the operator (step S356). On the other hand, if the assigned page information contains a record corresponding to the search key, the controller 11 presents information in the record found to the operator. For example, the content of the record is displayed on the display unit 14. Upon completion of the operation at step S356 or S358, the controller 11 exits the record search process.

[7.2 Operations of Node Nn]

Figure 14:
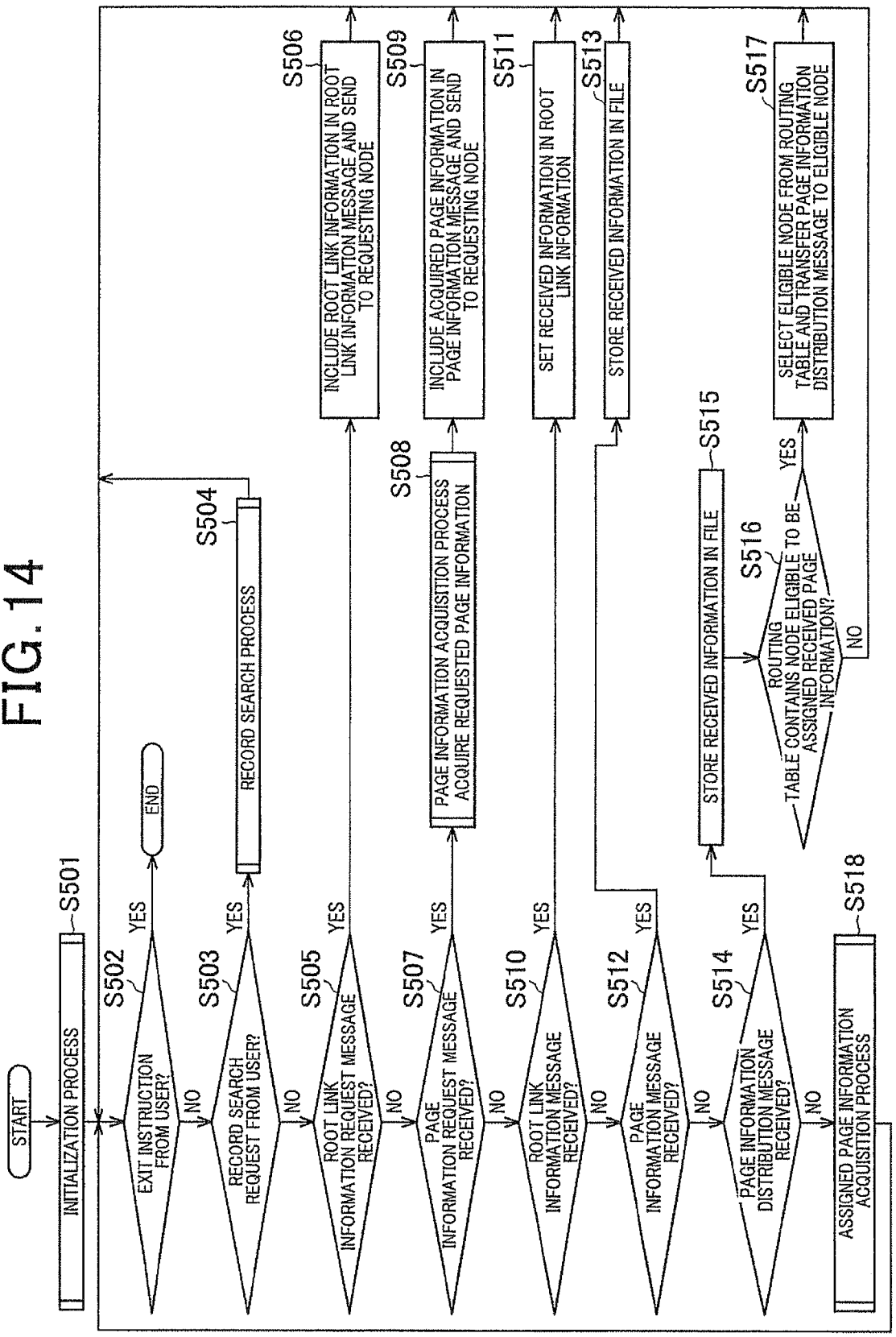
FIG. 14 is a flowchart illustrating an exemplary process performed by a controller 21 in a node Nn according to one embodiment.

A process illustrated in FIG. 14 is started when a node Nn participates in the distributed content storage system S. First, the controller 21 performs an initialization process (step S501). In the initialization process, the controller 21 acquires root link information. The initialization process will be described later in detail.

Then, the controller 21 determines whether or not an instruction to exit the process has been issued by a user on the basis of an input from the input unit 30 (step S502).

If the instruction to exit the process has not been issued at step S502 (step S502: NO), the controller 21 determines on the basis of an input from the input unit 30 whether or not search for a record has been requested by the user (step S503). If search for a record has been requested (step S503: YES), the controller 21 performs a record search process (step S504). In the record search process, catalog information is searched for a record corresponding to a search key specified by the user. The record search process is similar to the record search process performed on the center server SA and therefore detailed description of the process will be omitted. However, a page information acquisition process that follows the record search process differs from the page information acquisition process performed on the center server SA.

If the controller 21 determines at step S503 that a record search request has not been issued (step S503: NO), the controller 21 determines whether or not a root link information request message has been received (S505). If a root link information request message has been received (step S505: YES), the controller 21 retrieves root link information from the RAM, includes the root link information in a root link information message, and sends the root link information message to the requesting node Nn (step S506).

If the controller 21 determines at step S505 that a root link information request message has not been received (step S505: NO), the controller 21 determines whether or not a page information request message has been received (step S507). If a page information request message has been received, the controller 21 performs the page information acquisition process (step S508). In proceeding to do so, the controller 21 specifies link information and a search key contained in the page information request message. In the page information acquisition process, page information pointed to by the specified link information is acquired from a file and is stored on the RAM. If there is not a file containing the page information pointed to by the specified link information, the page information is acquired from the center server SA or another node Nn. The page information acquisition process will be described later in detail. When the controller 21 acquires the requested page information, the controller 21 includes the page information in a page information message and sends the page information message to the requesting node Nn (step S509).

If the controller 21 determines at step S507 that a page information request message has not been received (step S507: NO), the controller 21 determines whether or not a root link information message has been received (step S510). If a root link information message has been received (step S510: YES), the controller 21 sets information contained in the root link information message in the RAM as root link information (step S511).

If the controller 21 determines at step S510 that a root link information message has not bee received (step S510: NO), the controller 21 determines whether or not a page information message has been received (step S512). If a page information message has been received (step S512: YES), the controller 21 stores information contained in the page information message in a file as page information (step S513).

If the controller 21 determines at step S512 that a page information message has not been received (step S512: NO), the controller 21 determines whether or not a page information distribution message has been received (step S514). If a page information distribution message has been received (step S514: YES), the controller 21 sores information contained in the page information distribution message in a file as page information (step S515).

Then, the controller 21 determines whether or not there is a node Nn that is more eligible to be assigned page information contained in the received page information distribution message than the node Nn of the controller 21 itself (step S516). The controller 21 determines whether or not there is a node Nn that is more eligible to be assigned page information than the node Nn of the controller 21 itself. The controller 21 makes the determination on the basis of node IDs registered in the routing table and an index of the page information contained in the received page information distribution message. If a more eligible node Nn or nodes Nn are found (step S516: YES), the controller 21 transfers the page information distribution message to the node Nn that is most eligible to be assigned the page information contained in the received page information distribution message (step S517).

If the controller 21 determines at step S514 that a page information distribution message has not been received (step S514: NO), the controller 21 performs an assigned page information acquisition process (step S518). In the assigned page information acquisition process, page information in a range assigned to the node Nn is acquired from the server SA or another node Nn and is stored in the storage 22.

After completion of step S504, S506, S509, S511, S513, S517, or S518 or if there is not a node Nn that is more eligible to be assigned the page information contained in the received page information distribution message than the node Nn of the controller 21 at step S516, the controller 21 returns to step S502. When an exit instruction is issued by the user at step S502 (step S502: YES), the controller 21 exits the process.

Figure 15:
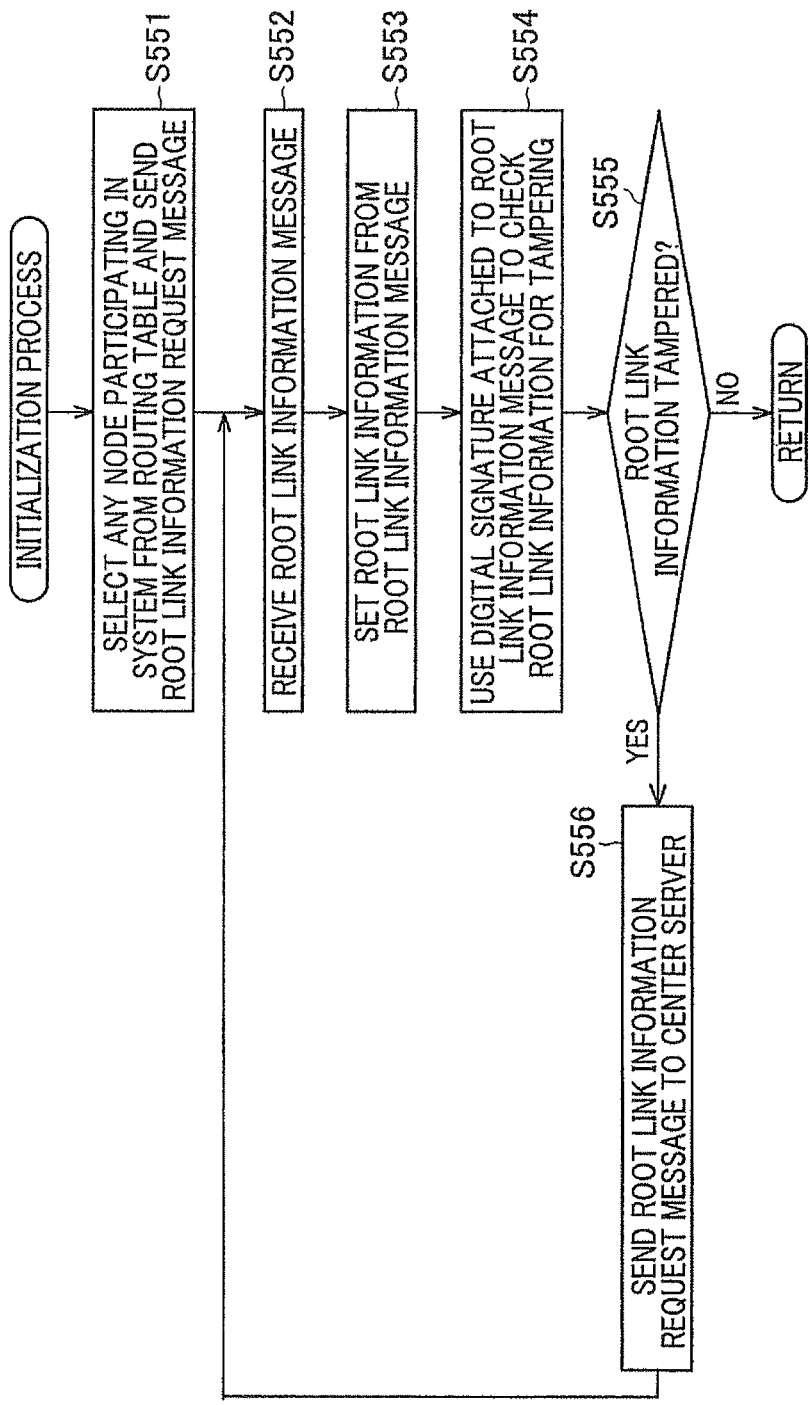
FIG. 15 is a flowchart illustrating an exemplary initialization process performed by the controller 21 in the node Nn according to one embodiment.

In the initialization process illustrate in FIG. 15, first the controller 21 sends a root link information request message to another node Nn participating in the distributed content storage system S (step S551). Any node Nn may be selected as the node Nn to which the root link information request message is to be sent from among the nodes Nn with node information registered in the routing table, for example.

Then, the controller 21 receives a root link information message sent from the node Nn in response to the root link information request message (step S552). The controller 21 then acquires root link information from the received root link information message and stores the link information on the RAM (step S553). The controller 21 then checks the root link information for tampering by using a digital signature attached to the root link information message (step S554). The check method is the same as the method for checking root link information for tampering in the initialization process performed on the center server SA.

Then the controller 21 determines whether or not the root link information has been tampered (step S555). If the root link information has not been tampered (step S555: NO), the controller 21 exits the initialization process.

On the other hand, if the root link information has been tampered (step S555: YES), the controller 21 sends a root link information request message to the center server SA (step S556). Then the controller 21 returns to step S552, where the controller 21 again receives a root link information message from the center server SA, sets root link information, and check the root link information for tampering (steps S552 through S554).

If the controller 21 determines at step S555 that the root link information received from the center server SA has not been tampered (step S555: NO), the controller 21 exits the initialization process.

Figure 16:
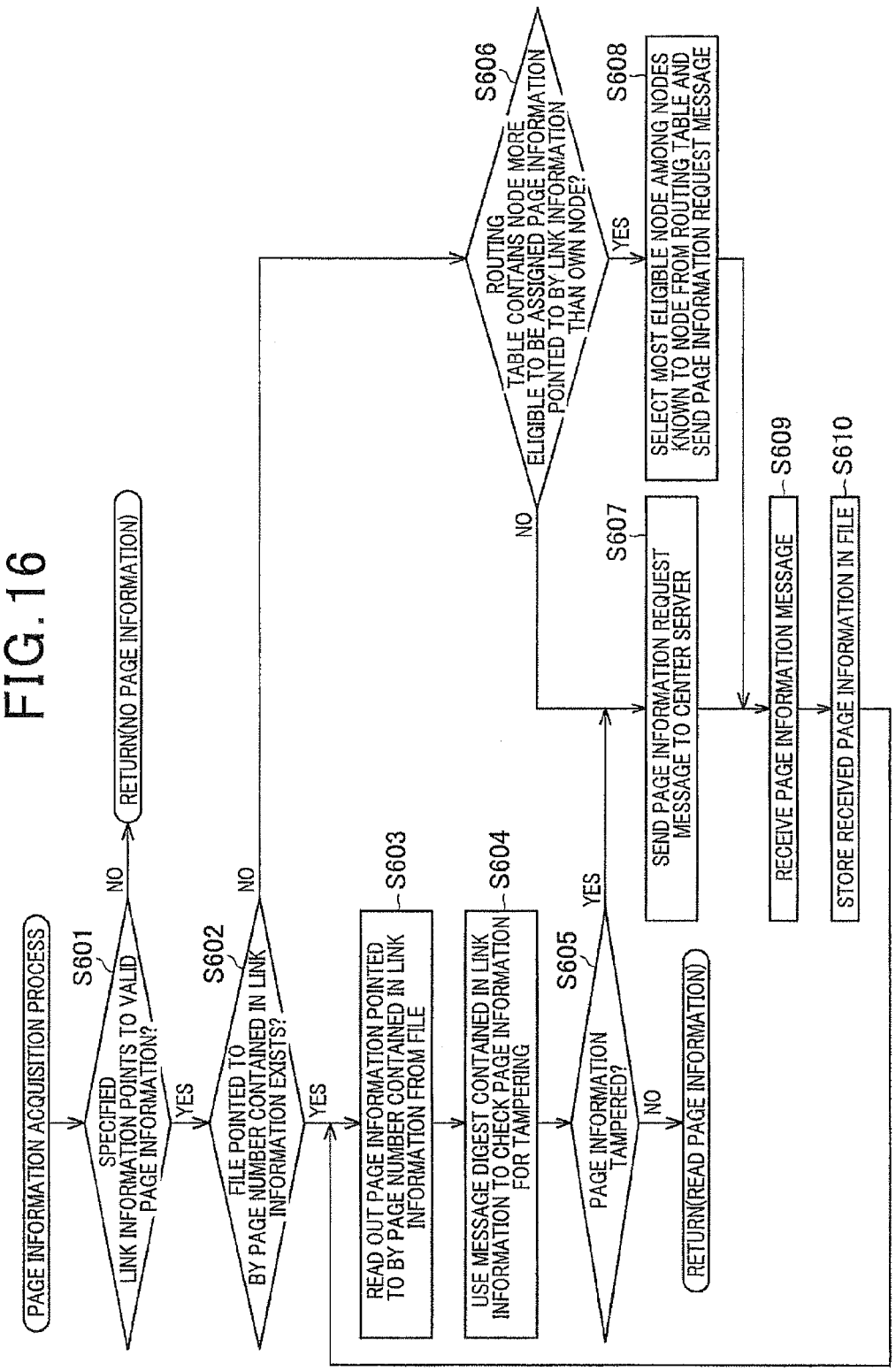
FIG. 16 is a flowchart illustrating an exemplary page information acquisition process performed by the controller 21 in the node Nn according to one embodiment.

In the page information acquisition process illustrated in FIG. 16, first the controller 21 determines whether or not specified link information points to valid page information (step S601). For example, if an invalid page number is set in the link information, the link information does not point to valid page information. For example, if it is specified that a page number should start at 1, link information containing a page number greater than or equal to 1 is valid; link information containing a page number, 0, is invalid. If the specified link information does not point to valid page information (step S601: NO), the controller 21 exits the page information acquisition process. If that is the case, information indicating that page information has not been found is returned to the calling process.

On the other hand, if the specified link information points to valid page information (step S601: YES), the controller 21 determines whether or not a file pointed to by the page number contained in the link information is stored in the storage 22 (step S602). If a file pointed to by the page number contained in the specified link information is stored (step S602: YES), the controller 21 reads out page information from the file pointed to by the page number contained in the link information and stores the page information on the RAM (step S603).

Then the controller 21 uses a message digest contained in the specified link information to check the read page information for tampering (step S604). The check method is the same as the method for checking page information for tampering in the page information acquisition process performed on the center server SA.

The controller 21 then determines whether or not the read root page information has been tampered (step S605). If the page information has not been tampered (step S605: NO), the controller 21 returns the read page information to the calling process and exits the page information acquisition process.

If the controller 21 determines at step S602 that the file pointed to by the page number contained in the specified link information is not stored (step S602: NO), the controller 21 determines whether or not there is a node Nn that is more eligible to be assigned page information pointed to by the link information than the node Nn of the controller 21 (step S606). The determination is made as to whether there is a more eligible node among the nodes Nn with node information registered in the routing table. A node Nn that is more eligible to be assigned the page information than the node Nn of the controller 21 may be a node Nn with a node ID having more leftmost digits identical to those of the specified search key than the node ID of the node Nn of the controller 21, for example.

If there is not a node Nn that is more eligible to be assigned the page information pointed to by the link information than the node Nn of the controller 21 (step S606: NO) or if it is determined at step S605 that the page information has been tampered (step S605: YES), the controller 21 sends a page information request message to the center server SA (step S607). The controller 21 sets the specified link information and the search key in the page information request message.

On the other hand, if there is a node Nn or nodes Nn that are more eligible to be assigned the page information pointed to by the link information than the node Nn of the controller 21, the controller 21 sends a page information request message to the node Nn that is most eligible to be assigned the page information pointed to by the link information (step S608). The node Nn that is most eligible to be assigned the page information may be a node Nn with a node ID having most leftmost digits identical to those of the specified search key, for example.

After sending the page information request message at step S607 or S608, the controller 21 receives a page information message sent from the center server SA or the node Nn in response to the page information request message (step S609). The controller 21 then stores information contained in the received page information message in a file as page information (step S610). Upon completion of the operation, the controller 21 returns to step S603, where the controller 21 again reads out page information and checks the read page information for tampering (steps S603 and S604). If the controller 21 determines at step S605 that the page information has not been tampered (step S605: NO), the controller 21 exits the page information acquisition process.

Figure 17:
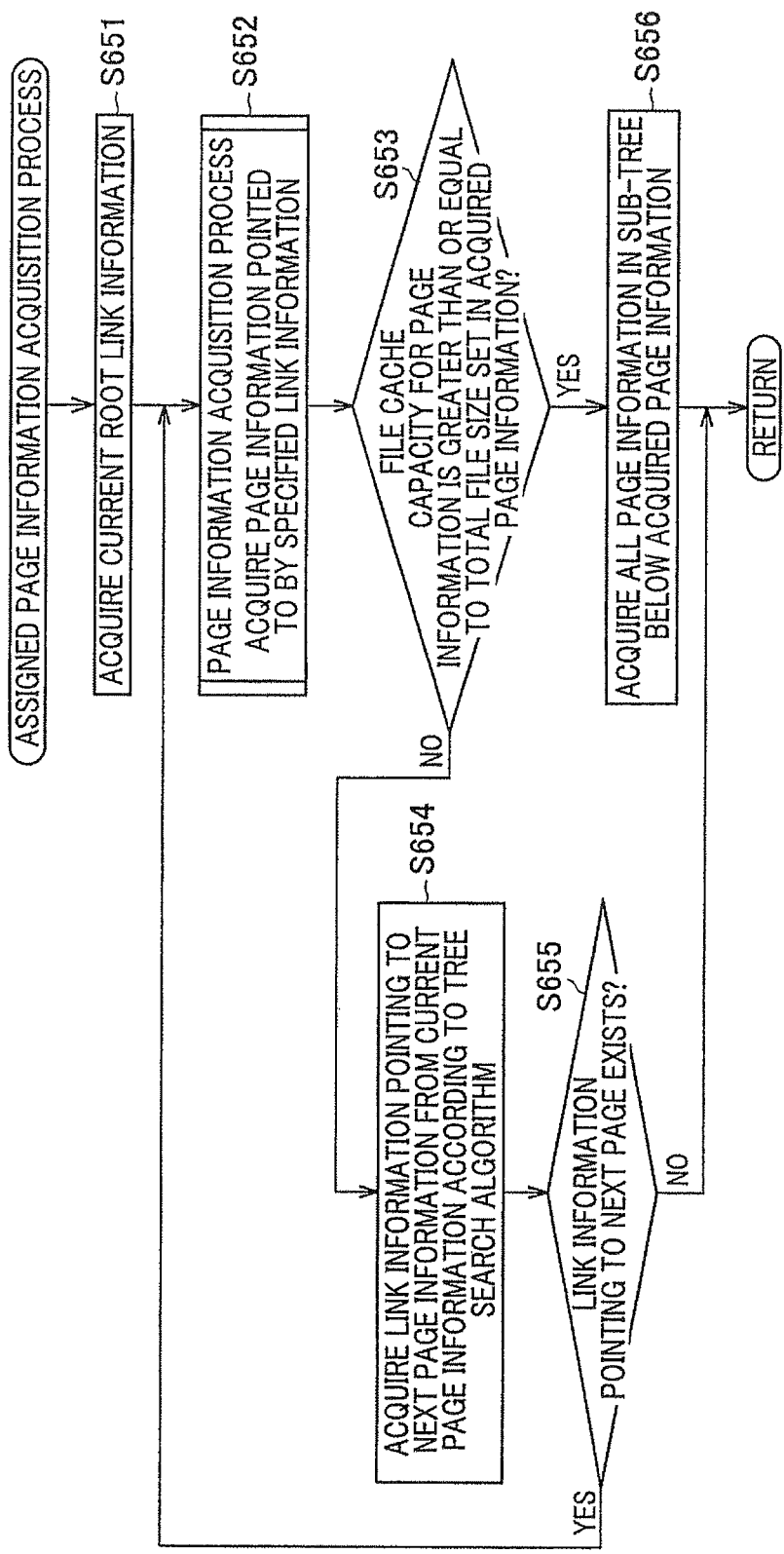
FIG. 17 is a flowchart illustrating an exemplary assigned page information acquisition process performed by the controller 21 in the node Nn according to one embodiment.

In the assigned page information acquisition process illustrated in FIG. 17, first the controller 21 retrieves the current root information from the RAM (step S651). Then the controller 21 performs the page information acquisition process (step S652). In proceeding to do so, the controller 21 specifies the retrieved root link information. The controller 21 also specifies the node ID of the node Nn of the controller 21 itself as a search key. The page information acquired in the page information acquisition process becomes the page information currently being referred to.

Then the controller 21 determines whether or not a file cache capacity for storing page information is greater than or equal to a total file size set in the page information acquired (step S653). The controller 21 determines the file cache capacity before the determination at step S653 at the latest. The file cache capacity may be a fixed value or may be determined depending on the capacity of the storage 22. If the file cache capacity is less than the total file size set in the acquired page information (step S653: NO), the controller 21 acquires link information pointing to next page information from the page information currently being referred to (step S654). Here, the next page information is page information in an assigned range among pieces of child page information of the page information currently being referred to. The controller 21 first determines the assigned range based on the node ID of the node Nn of the controller 21. Determination of the assigned range is made according to a search algorithm appropriate for the search tree structure of the catalog information. For example, if the page information currently being referred to is root page information, page information with an index having the leftmost digit matches the leftmost digit of the node ID is included in the assigned range. If the page information currently being referred to is child page information of the root page information, page information with an index having the two leftmost digits that are identical to those of the node ID is included in the assigned range. Then, the controller 21 determines which of pieces of child page information among pieces of child page information of the page information currently being referred to is in the determined assigned range. For example, the controller 21 determines whether or not there is page information containing an index that falls in the determined assigned range among pieces of child page information of the root page information. More specifically, the controller 21 determines which of pieces of child page information of the page information currently being referred to is in the determined assigned range. The controller 21 then acquires link information pointing to the page information determined to fall in the assigned range.

Then, the controller 21 determines whether or not there is link information pointing to next page information (step S655). That is, the controller 21 determines whether or not link information pointing to next page information has been acquired. If there is link information pointing to next page information (step S655:YES), the controller 21 returns to step S652. Here, the controller 21 specifies the acquired link information and also specifies the node ID of the node Nn of the controller 21 as a search key to perform the page information acquisition process.

If the controller 21 determines at step S653 that the file cache capacity is greater than or equal to the total file size set in the acquired page information (step S653: YES), the controller 21 acquires all pieces of page information included in a sub-tree with the acquired page information at the top (step S656), except the page information at the top since the page information at the top has already been acquired in the page information acquisition process at step S652. At step S656, the page information acquisition process is performed for acquiring each of the pieces of page information included in the sub-tree. That is, if a file containing page information to be acquired is not stored in the storage 22, the page information to be acquired is acquired from the center server SA or another node Nn. Since each node Nn has only to acquire and store page information in the rang assigned to that node Nn, the storage load on each node Nn can be reduced and page information can be efficiently distributed and stored among nodes Nn. When there is a free space in the file cache, each node Nn can hold as much page information as possible. Accordingly, communication load for acquiring page information can be reduced. Furthermore, by using the catalog information having a tree structure in which pieces of page information are associated one another along the path from root page information to leaf page information, each node Nn can check records to determine whether they have been tampered or not and the time required for searching records can be reduced.

After completion of step S656 or if there is not link information pointing to next page information at step S655 (step S655: NO), the controller 21 exits the assigned page information acquisition process.

Second Embodiment

A second embodiment of the present invention will be described below with reference to FIG. 18.

In the first embodiment described above, a node Nn to which page information contained in a received page information distribution message is assigned only stores the page information as a file. A node Nn to which page information contained in a received page information distribution message is assigned is hereinafter referred to as an "assigned-to node". In the second embodiment, an assigned-to node distributes page information to one or more nodes Nn existing within a close range of the assigned-to node Nn. Consequently, the page information is held by the assigned-to node Nn and the node or nodes Nn in the close range of the assigned-to Node Nn. A page information request message sent from a node apparatus that wants the page information will be transferred to the assigned-to node Nn. If a node Nn that received the page information request message is not the node that is assigned the requested page information but holds the requested page information, the node Nn can send the page information to the requesting node Nn. Accordingly, the load of sending page information is distributed among nodes Nn, reducing the load on the assigned-to nodes Nn.

Here, a node Nn within a close range of an assigned-to node may be a node Nn with a node ID value with a difference in a predetermined range from the node ID value of the assigned-to node Nn or may be a node Nn with a node ID having a predetermined number of leftmost digits that are identical to those of the node ID of the assigned-to node, for example.

Page information may be distributed by overlay multicast, for example. The overlay multicast may be for example a DHT multicast disclosed in Japanese Patent Laid-Open No. 2007-053662. In the method disclosed in Japanese Patent Laid-Open No. 2007-053662, information is transferred to nodes Nn with node information registered in a routing table. Furthermore, a target node ID and an ID mask are used to limit the range of nodes Nn to which the page information is transferred. In the present embodiment, when an assigned-to node distributes page information, the assigned-to node Nn sets its own node ID as the target node ID and sets a value greater than or equal to 1 as the ID mask. With these settings, destination nodes to which page information is distributed can be limited to those nodes Nn that exist within a close range of the assigned-to node.

The configuration and general operations of the distributed content storage system S, the configuration of the center server SA, and the configuration of each node Nn are the same as those in the first embodiment and therefore the description of the configurations and functions will be omitted. Operations of the center server SA are the same as those in the first embodiment and therefore the description of the center server SA will be omitted. Operations of nodes Nn are also the same as the operations of the nodes Nn in the first embodiment except a process which will be described below. Therefore the description of the same operations will be omitted.

Figure 18:
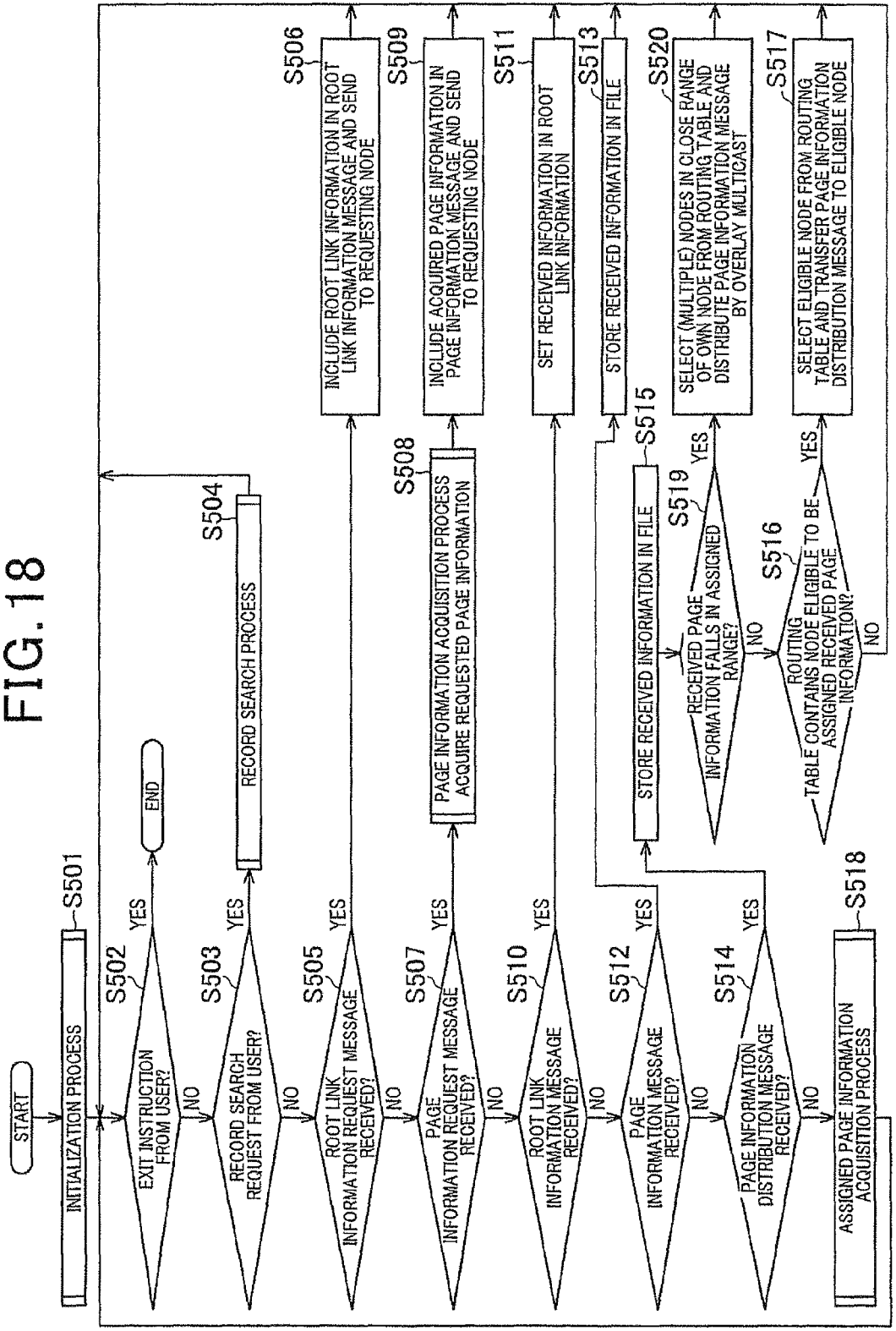
FIG. 18 is a flowchart illustrating an exemplary process performed by the controller 21 in the node Nn according to one embodiment.

In the exemplary process in FIG. 18, the same elements as those in FIG. 14 are labeled the same reference numerals as those in FIG. 14. The process illustrated in FIG. 18 is the same as the process illustrated in FIG. 14 except a process performed when a page information distribution message is received. Therefore, description of the other processes will be omitted.

When a controller 21 has received a page information distribution message at step S514 (step S514: YES), the controller 21 stores information contained in the page information distribution message in a file as page information (step S515).

The controller 21 then determines whether or not the page information contained in the received page information distribution message falls within a range assigned to the node Nn of the controller 21 (step S519). The determination is made for example on the basis of an index set in the page information and the node ID of the node Nn of the controller 21. For example, if the node ID falls within the range between the minimum and maximum values of the indexes set in the page information or matches an index value set in the page information, it is determined that the page information is included in the range assigned to the node Nn.

If the received page information is included in the range assigned to the node Nn of the controller 21 (step S519: YES), the controller 21 sends a page information message containing the page information stored in the file to nodes Nn within a close range of the node Nn of the controller 21 (step S520). Specifically, the controller 21 selects nodes Nn that are in a close range of the node Nn of the controller 21 from a routing table. The controller 21 sends the page information message to the selected nodes Nn by using overlay multicast. Upon completion of the operation, the controller 21 returns to step S502.

If, at step S519, the received page information does not fall within the range assigned to the node Nn of the controller 21 (step S519: NO), the controller 21 determines whether or not there is a node Nn that is more eligible to be assigned the page information contained in the received page information distribution message than the node Nn of the controller 21 (step S516). If there is a more eligible node or nodes Nn (step S516: YES), the controller 21 transfers the page information distribution message to the node Nn that is most eligible to be assigned the page information contained in the page information distribution message (step S517). After completion of step S517 or if the controller 21 determines at step S516 that there is not a node Nn more eligible to be assigned the page information contained in the received page information distribution message than the node Nn of the controller 21, the controller 21 returns to step S502.

While the center server SA in the embodiments described above generates page information and sends a page information distribution message to nodes Nn that are likely to be assigned the page information, the center server SA may sends the page information distribution message to other nodes Nn as well. For example, the center server SA may distribute page information that is within a predetermined distance from root page information to all nodes Nn in the distributed content storage system S. Here, the distance from the root page information is the distance equivalent to the number of links along the path from the root to a node point of interest in the tree structure. Page information at a closer distance to root page information is more frequently referred to in record search than page information at a farther distance from the root page. It may be efficient that all nodes Nn hold in advance page information that is relatively frequently referred to. Overlay multicast may be used to distribute page information to all nodes Nn.

While an assigned range is ultimately determined according to a file cache capacity in the embodiments described above, the file cache capacity may be excluded from considerations in determining the assigned range. In that case, for example, page information with an index having a predetermined number of leftmost digits that are identical to the predetermined number of leftmost digits of the node ID of a node Nn may be determined as the range assigned to the node.

In the embodiments described above, when a node Nn searches for a record, the node Nn acquires page information that the node Nn does not hold from the content server SA or another node Nn and refers to the acquired page information to search for a record by oneself. However, the node Nn may select another node Nn that is likely to hold required page information on the basis of a node ID and request the node Nn to search for the record. In that case, the requested node Nn searches the page information it holds for the record and sends the found record to the requesting node Nn. If the requested node Nn does not hold the required page information, the requested node Nn transfers the search request to another node Nn. The search request is transferred in the same way that a page information request message is transferred.

While the management apparatus according to the present invention is applied to a server apparatus in a peer-to-peer system in the embodiments described above, the management apparatus can be applied to a server apparatus in a client-server system as well.

The present invention is not limited to content catalog information search. The present invention is applicable to records and indexes in general purpose databases as well.

What is claimed is:

1. A distributed storage system comprising a management apparatus and a plurality of node apparatuses, wherein,
the management apparatus comprises:
a first storage device configured to store a plurality of pieces of page information in association with one another as a tree structure descending from root page information to leaf page information, the plurality of pieces of page information including:
the leaf page information including one or a plurality of records and being located at a leaf of the tree structure;
the root page information including tampering check information used for checking child page information at a position of a child of root page information at a root of the tree structure or the record at a position of a child of the root page information to determine whether or not the child page information or the record has been tampered, and a serial number of child page information at a position of a child of the root page information; and
node page information including tampering check information used for checking child page information at a position of a child of node page information located between the root page information and the leaf page information or the record at a position of a child of the node page information to determine whether or not the child information or the record has been tampered, and a serial number of child page information at a position of a child of the node page information;
the first storage device configured to store root link information including a serial number of the root page information and tampering check information used for checking the root page information to determine whether or not the root page information has been tampered, the root link information including a digital signature for checking the root link information to determine whether or not the root link information has been tampered;
each of the plurality of node apparatuses comprises:
a first acquiring device configured to acquire through a network the root link information from the management apparatus or another node apparatus that has acquired the root link information;
a first deciding device configured to decide on a range of a plurality of pieces of page information to be assigned to each node apparatus according to a predetermined rule, the plurality of pieces of page information being transmitted and distributed among the plurality of node apparatuses;
a first determining device configured to determine whether or not child page information at a position of a child of root page information pointed to by the root link information acquired by the first acquiring device is page information within a range decided on by the first deciding device;
a second acquiring device configured to acquire the child page information and pieces of page information associated with one another descending from the child page information to leaf page information from the management apparatus or the another node apparatus as page information within the assigned range if the first determining device determines that the child page information is page information within the assigned range; and
a second storage device configured to store the information within the assigned range acquired by the second acquiring device in a predetermined storage area; and
the distributed storage system is a peer-to-peer system, which transmits and receives information among the plurality of node apparatuses.

2. A node apparatus comprising:
a first acquiring device configured to acquire root link information from a management apparatus or another node apparatus through a network;
a first deciding device configured to decide on a range of a plurality of pieces of page information to be assigned to each node apparatus according to a predetermined rule, the plurality of pieces of page information being transmitted and distributed among a plurality of node apparatuses;
a first determining device configured to determine whether or not child page information at a position of a child of root page information pointed to by the root link information acquired by the first acquiring device is page information within a range decided on by the first deciding device;
a second acquiring device configured to acquire the child page information and pieces of page information associated with one another descending from the child page information to leaf page information from the management apparatus or the another node apparatus as page information within the assigned range if the first determining device determines that the child page information is page information within the assigned range; and
a second storage device configured to store the page information within the assigned range acquired by the second acquiring device in a predetermined storage area;
wherein the management apparatus comprises:
a first storage device configured to store the plurality of pieces of page information in association with one another as a tree structure descending from root page information to leaf page information, the plurality of pieces of page information including:
the leaf page information including one or a plurality of records and being located at a leaf of the tree structure;
the root page information including tampering check information used for checking child page information at a position of a child of root page information at a root of the tree structure or the record at a position of a child of the root page information to determine whether or not the child page information or the record has been tampered, and a serial number of child page information at a position of a child of the root page information; and
node page information including tampering check information used for checking child page information at a position of a child of node page information located between the root page information and the leaf page information or the record at a position of a child of the node page information to determine whether or not the child information or the record has been tampered, and a serial number of child page information at a position of a child of the node page information;
the first storage device configured to store the root link information including a serial number of the root page information and tampering check information used for checking the root page information to determine whether or not the root page information has been tampered, the root link information including a digital signature for checking the root link information to determine whether or not the root link information has been tampered; and
the node apparatus is part of a peer-to-peer distributed storage system, which transmits and receives information among the plurality of node apparatuses.

3. The node apparatus according to claim 2, further comprising a second deciding device configured to decide on a storage capacity capable of storing the page information within the assigned range; and
a second determining device configured to determine whether or not a total data amount of child page information at a position of a child of root page information pointed to by the root link information and pieces of page information associated with one another from the child page information to leaf page information is less than or equal to the storage capacity decided on by the second deciding device;
wherein the second acquiring device acquires the child page information if the first determining device determines that the child page information is page information within the assigned range, and acquires pieces of page information associated with one another from the child page information to leaf page information if the second determining device determines that the total data amount is less than or equal to the storage capacity of the storage area; and
the second storage device stores the acquired page information within the assigned range in the storage area.

4. The node apparatus according to claim 3, wherein,
if the second determining device determines that the total data amount is greater than the storage capacity of the storage area, the first determining device determines whether or not next child page information that has the acquired child page information as a parent and is associated with the page information is page information within the assigned range;
if the first determining device determines that the next child page information is page information within the assigned range, the second determining device determines whether or not the total data amount of the next child page information and pieces of page information associated with one another from the next child page information to leaf page information is less than or equal to the storage capacity of the storage area; and
if the first determining device determines that the next child page information is page information within the assigned range, the second acquiring device acquires the next child page information; if the second determining device determines that the total data amount is less than or equal to the storage capacity of the storage area, acquires pieces of page information associated with one another from the next child page information to leaf page information as page information within the assigned range, and the second storage device stores the acquired page information within the assigned range in the storage area.

5. The node apparatus according to claim 4, wherein each of the pieces of page information includes information indicating a total data amount of the piece of page information and all pieces of page information associated with one another from the piece of page information to leaf page information.

6. The node apparatus according to claim 2, wherein the first determining device determines, on the basis of unique identification information assigned to a node apparatus from which the first acquiring device has acquired the root link information, whether or not index information contained in child page information at a position of a child of root page information pointed to by the root link information is index information within a range assigned to the node apparatus; and if the first determining device determines that the index information is index information within the assigned range, the second acquiring device acquires child page information at a position of a child of page information containing the index information within the assigned range.

7. A non-transitory recording medium on which a node program for a node apparatus is recorded, the node program causing a computer to implement steps comprising:

acquiring root link information from a management apparatus or another node apparatus through a network;

deciding on a range of a plurality of pieces of page information to be assigned to each node apparatus according to a predetermined rule, the plurality of pieces of page information being transmitted and distributed among a plurality of node apparatuses;

determining whether or not child page information at a position of a child of root page information pointed to by the root link information acquired by the first acquiring is page information within a range decided on by the first deciding;

acquiring the child page information and pieces of page information associated with one another descending from the child page information to leaf page information from the management apparatus or the another node apparatus as page information within the assigned range if the first determining determines that the child page information is page information within the assigned range; and storing the information within the assigned range acquired by the second acquiring in a predetermined storage area;

wherein the management apparatus comprises:

a first storage device configured to store the plurality of pieces of page information in association with one another as a tree structure descending from root page information to leaf page information, the plurality of pieces of page information including:

the leaf page information including one or a plurality of records and being located at a leaf of the tree structure;

the root page information including tampering check information used for checking child page information at a position of a child of root page information at a root of the tree structure or the record at a position of a child of the root page information to determine whether or not the child page information or the record has been tampered, and a serial number of child page information at a position of a child of the root page information; and node page information including tampering check information used for checking child page information at a position of a child of node page information located between the root page information and the leaf page information or the record at a position of a child of the node page information to determine whether or not the child information or the record has been tampered, and a serial number of child page information at a position of a child of the node page information;

the first storage device configured to store the root link information including a serial number of the root page information and tampering check information used for checking the root page information to determine whether or not the root page information has been tampered, the root link information including a digital signature for checking the root link information to determine whether or not the root link information has been tampered; and the node apparatus is part of a peer-to-peer distributed storage system, which transmits and receives information among the plurality of node apparatuses.

8. A page information acquisition method performed by a node apparatus, the method comprising steps of:

acquiring root link information from a management apparatus or another node apparatus through a network;

deciding on a range of a plurality of pieces of page information to be assigned to each node apparatus according to a predetermined rule, the plurality of pieces of page information being transmitted and distributed among a plurality of node apparatuses;

determining whether or not child page information at a position of a child associated with root page information pointed to by the root link information acquired by the first acquiring is page information within a range decided on by the first deciding;

acquiring the child page information and pieces of page information associated with one another descending from the child page information to leaf page information from the management apparatus or the another node apparatus as page information within the assigned range if the first determining determines that the child page information is page information within the assigned range; and storing the page information within the assigned range acquired by the second acquiring in a predetermined storage area;

wherein the management apparatus comprises:

a first storage device configured to store the plurality of pieces of page information in association with one another as a tree structure descending from root page information to leaf page information, the plurality of pieces of page information including:

the leaf page information including one or a plurality of records and being located at a leaf of the tree structure;

the root page information including tampering check information used for checking child page information at a position of a child of root page information at a root of the tree structure or the record at a position of a child of the root page information to determine whether or not the child page information or the record has been tampered, and a serial number of child page information at a position of a child of the root page information; and node page information including tampering check information used for checking child page information at a position of a child of node page information located between the root page information and the leaf page information or the record at a position of a child of the node page information to determine whether or not the child information or the record has been tampered, and a serial number of child page information at a position of a child of the node page information;

the first storage device configured to store the root link information including a serial number of the root page information and tampering check information used for checking the root page information to determine whether or not the root page information has been tampered, the root link information including a digital signature for checking the root link information to determine whether or not the root link information has been tampered; and the node apparatus is part of a peer-to-peer distributed storage system, which transmits and receives information among the plurality of node apparatuses.

9. A management apparatus comprising:

a first storage device configured to store a plurality of pieces of page information in association with one another as a tree structure descending from root page information to leaf page information, the plurality of pieces of page information including:

the leaf page information including one or a plurality of records and being located at a leaf of the tree structure;

the root page information including tampering check information used for checking child page information at a position of a child of root page information at a root of the tree structure or the record at a position of a child of the root page information to determine whether or not the child page information or the record has been tampered, and a serial number of child page information at a position of a child of the root page information; and node page information including tampering check information used for checking child page information at a position of a child of node page information located between the root page information and the leaf page information or the record at a position of a child of the node page information to determine whether or not the child information or the record has been tampered, and a serial number of child page information at a position of a child of the node page information;

the first storage device configured to store root link information including a serial number of the root page information and tampering check information used for checking the root page information to determine whether or not the root page information has been tampered, the root link information including a digital signature for checking the root link information to determine whether or not the root link information has been tampered; and a sending device configured to send page information stored in the storage device to a node apparatus through a peer-to-peer network, which transmits and receives information among a plurality of node apparatuses, the plurality of pieces of page information being transmitted and distributed among the plurality of node apparatuses.

10. The management apparatus according to claim 9, further comprising a third deciding device configured to decide on a node apparatus to which page information is to be sent, on the basis of assigned range information indicating a range of page information assigned to each node apparatus according to a predetermined rule;

wherein the sending device sends the page information to the node apparatus decided on by the third deciding device through the network.

11. The management apparatus according to claim 10, further comprising:

a leaf page information generating device configured to generate the leaf page information; and an updating device configured to update the serial numbers and the tampering check information of the node page information and the root page information along a path from the leaf page information generated by the leaf page information generating device to the root page information on the basis of generation of the leaf page information;

wherein the third deciding device decides on a node apparatus to which the page information updated by the updating device is to be sent on the basis of the assigned range information; and the sending device sends the page information updated by the updating device to the node apparatus decided on by the third deciding device as a node apparatus to which the page information is to be sent.

12. The management apparatus according to claim 10, further comprising an address information storage device configured to store network address information of at least some of a plurality of node apparatuses included in a distributed content storage system in which a plurality of pieces of content data are stored on the plurality of node apparatuses in a distributed manner and the plurality of node apparatuses are capable of sending and receiving content data through a network, wherein:

the address information storage device stores unique identification information assigned to each of the node apparatuses in association with the address information of the node apparatus;

the third deciding device decides on a node apparatus to be assigned the page information updated by the updating device as page information included in the assigned range on the basis of the identification information of a node apparatus whose network address information is stored in the address information storage device and on index information contained in the page information updated by the updating device.

13. A node apparatus comprising:

a receiving device configured to receive the page information sent from the sending device of the management apparatus of claim 10;

a page information storage device configured to store page information received by the receiving device;

an address information storage device configured to store network address information of at least some of a plurality of node apparatuses included in a distributed content storage system in association with unique identification information assigned to the node apparatuses, the distributed content storage system being a system in which a plurality of pieces of content data are stored on a plurality of node apparatuses in a distributed manner and the plurality of node apparatuses are capable of sending and receiving content data through a network; and a transfer device configured to transfer page information received by the receiving device to a node apparatus decided on by the third deciding device through the network;

wherein the third deciding device decides on a node apparatus to which the received page information is to be sent, on the basis of the identification information of the node apparatus whose network address information is stored in the address information storage device and on index information contained in the page information received by the receiving device.

14. The node apparatus according to claim 13, further comprising a third determining device configured to determine whether or not page information received by the receiving device is page information within an assigned range indicated by assigned range information decided on by the third deciding device, wherein:
- if the third determining device determines that the page information is page information within an assigned range, the third deciding device decides on a node apparatus to which the received page information is to be sent, on the basis of the identification information of the node apparatus whose network address information is stored in the address information storage device and on index information contained in the page information received by the receiving device; and
- the transfer device transfers the page information determined by the third determining device to be page information within the assigned range to the node apparatus decided on by the third deciding device through the network.

15. A non-transitory recording medium on which a page information sending program is recorded, the page information sending program causing a computer to implement sending page information stored in a first storage section to a node apparatus through a network, the first storage section storing:
- a plurality of pieces of page information in association with one another as a tree structure descending from root page information to leaf page information, the plurality of pieces of page information including:
  - the leaf page information including one or a plurality of records and being located at a leaf of the tree structure;
  - the root page information including tampering check information used for checking child page information at a position of a child of root page information at a root of the tree structure or the record at a position of a child of the root page information to determine whether or not the child page information or the record has been tampered, and a serial number of child page information at a position of a child of the root page information;
  - node page information including tampering check information used for checking child page information at a position of a child of node page information located between the root page information and the leaf page information or the record at a position of a child of the node page information to determine whether or not the child information or the record has been tampered;
  - root link information including a serial number of the root page information and tampering check information used for checking the root page information to determine whether or not the root page information has been tampered, the root link information including a digital signature for checking the root link information to determine whether or not the root link information has been tempered, wherein
- the node apparatus is part of a peer-to-peer distributed storage system, which transmits and receives information among a plurality of node apparatuses, the plurality of pieces of page information being transmitted and distributed among the plurality of node apparatuses.

16. A recording medium on which a node program is recorded, the node program causing a computer to implement steps comprising:
- receiving the page information sent from the management apparatus of claim 9;
- page information storing page information received by the receiving;
- third deciding on a node apparatus to which the received page is to be sent, on the basis of the identification information of the node apparatus whose network address information is stored in an address information storage device and index information contained in the page information received by the receiving, the address information storage device storing network address information of at least some of a plurality of node apparatuses included in a distributed content storage system in association with unique identification information assigned to the node apparatuses, the distributed content storage system being a system in which a plurality of pieces of content data are stored on a plurality of node apparatuses in a distributed manner and the plurality of node apparatuses are capable of sending and receiving content data through a network; and
- transferring page information received by the receiving to a node apparatus decided on by the third deciding through the network.

17. A page information sending method comprising:
sending page information stored in a first storage section to a node apparatus through a network, the first storage section storing:
a plurality of pieces of page information in association with one another as a tree structure descending from root page information to leaf page information, the plurality of pieces of page information including:
- the leaf page information including one or a plurality of records and being located at a leaf of the tree structure;
- the root page information including tampering check information used for checking child page information at a position of a child of root page information at a root of the tree structure or the record at a position of a child of the root page information to determine whether or not the child page information or the record has been tampered, and a serial number of child page information at a position of a child of the root page information;
- node page information including tampering check information used for checking child page information at a position of a child of node page information located between the root page information and the leaf page information or the record at a position of a child of the node page information to determine whether or not the child information or the record has been tampered;
- root link information including a serial number of the root page information and tampering check information used for checking the root page information to determine whether or not the root page information has been tampered, the root link information including a digital signature for checking the root link information to determine whether or not the root link information has been tampered, wherein
- the node apparatus is part of a peer-to-peer distributed storage system, which transmits and receives information among a plurality of node apparatuses, the plurality of pieces of page information being transmitted and distributed among the plurality of node apparatuses.

* * * * *